US007864333B1

(12) United States Patent
Olczak et al.

(10) Patent No.: US 7,864,333 B1
(45) Date of Patent: Jan. 4, 2011

(54) POLARIZATION MODULATED IMAGE CONJUGATE PISTON SENSING AND PHASE RETRIEVAL SYSTEM

(75) Inventors: Gene Olczak, Pittsford, NY (US); Cormic K. Merle, Rochester, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 222 days.

(21) Appl. No.: 12/327,342

(22) Filed: Dec. 3, 2008

(51) Int. Cl.
*G01B 11/02* (2006.01)
(52) U.S. Cl. ...................................... 356/491; 356/508
(58) Field of Classification Search ................. 356/491, 356/492, 493, 508
See application file for complete search history.

(56) References Cited

U.S. PATENT DOCUMENTS

| | | | |
|---|---|---|---|
| 5,120,948 A | | 6/1992 | Wertheimer et al. |
| 5,602,643 A | * | 2/1997 | Barrett .......................... 356/495 |
| 6,304,330 B1 | | 10/2001 | Millerd et al. |
| 6,552,808 B2 | | 4/2003 | Millerd et al. |
| 7,230,717 B2 | | 6/2007 | Brock et al. |
| 2005/0046865 A1 | * | 3/2005 | Brock et al. .................. 356/495 |
| 2008/0204875 A1 | * | 8/2008 | Heil ............................ 359/485 |

OTHER PUBLICATIONS

Matthew R. Bolcar and James R. Fienup, "Method of Phase Diversity in Multi-aperture Systems Utilizing Individual Sub-aperture Control," *Unconventional Imaging*, Proc. SPIE 5896-14, San Diego, CA, Aug. 2005, pp. 126-133.

J. H. Bruning and H. Schreiber, *Optical Shop Testing*, Daniel Malacara ed., 3d ed., Jul. 2007, pp. 550, 557-568.

Fang Shi et al., "DCATT Dispersed Fringe Sensor: Modeling and Experimenting with the Transmissive Phase Plates," *International Symposium on Astronomical Telescopes and Instrumentation*, Munich, Germany, Mar. 27, 2000.

Fang Shi et al., "Experimental verification of dispersed fringe sensing as a segment phasing technique using the Keck telescope," *Applied Optics*, vol. 43., No. 23, Aug. 10, 2004, pp. 4474-4481.

Fang Shi et al., "Performance of Dispersed Fringe Sensor in the Presence of Segmented Mirror Aberrations—Modeling and Simulation," *SPIE Astronomical Telescopes 2006: Space Telescopes and Instrumentation I: Optical, Infrared, and Millimeter*, Orlando, Florida, May 24, 2006.

Alan Wertheimer and Tom Dey, "Wide-range, high-accuracy, white light piston sensor for segmented optics," *Optical Engineering*, vol. 34, No. 7, Jul. 1995, pp. 2149-2156.

\* cited by examiner

*Primary Examiner*—Patrick J Connolly
(74) *Attorney, Agent, or Firm*—RatnerPrestia

(57) ABSTRACT

A system for detecting piston diversity between mirror segments. The system includes a pupil plane mask, a transform optical element, and an image detector. The pupil plane mask includes two or more open mask areas and two or more polarizers. Each polarizer is disposed within a respective one of the open mask areas. A first one of the two or more polarizers has a first polarization orientation, and a second of the two or more polarizers has a second polarization orientation.

20 Claims, 19 Drawing Sheets

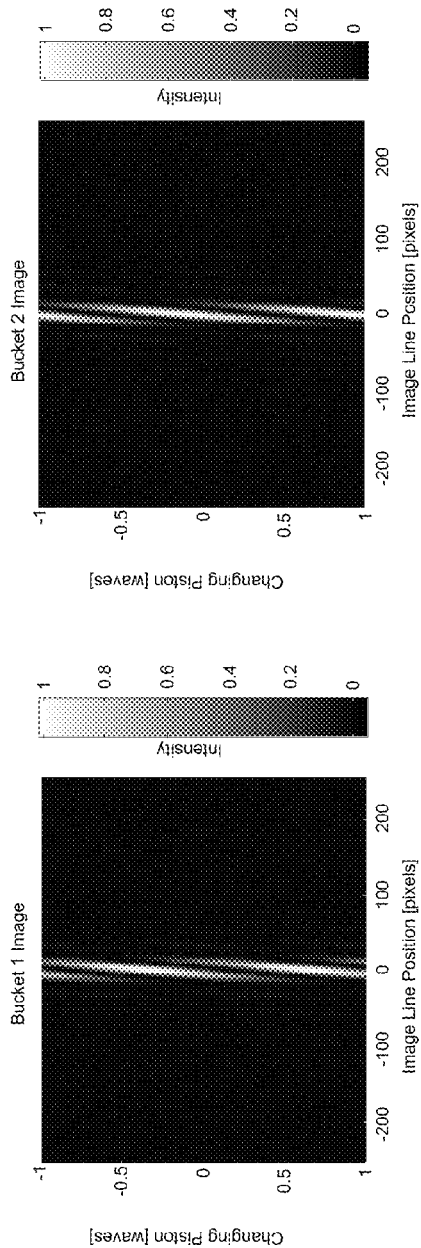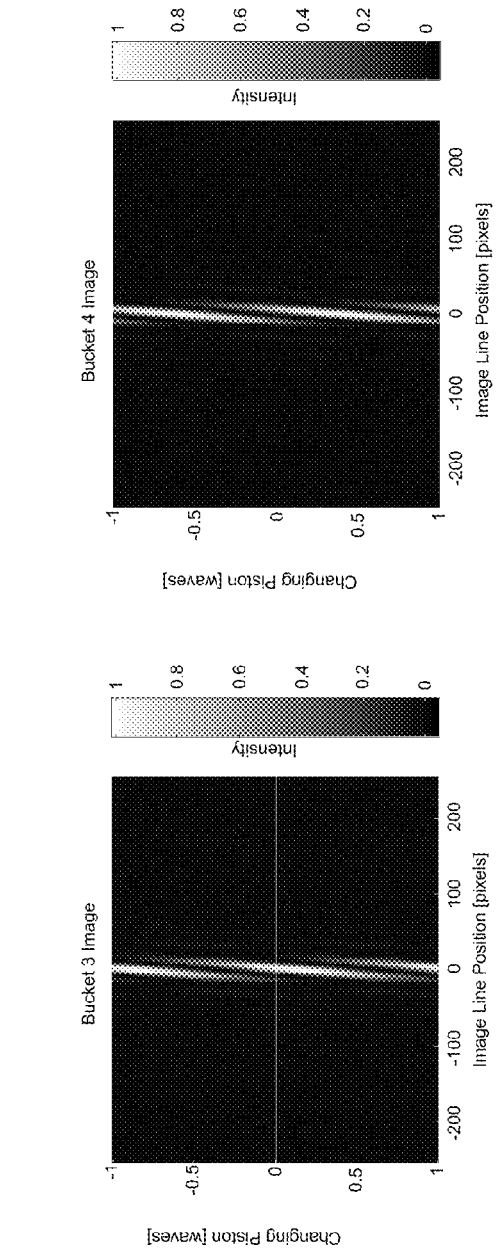

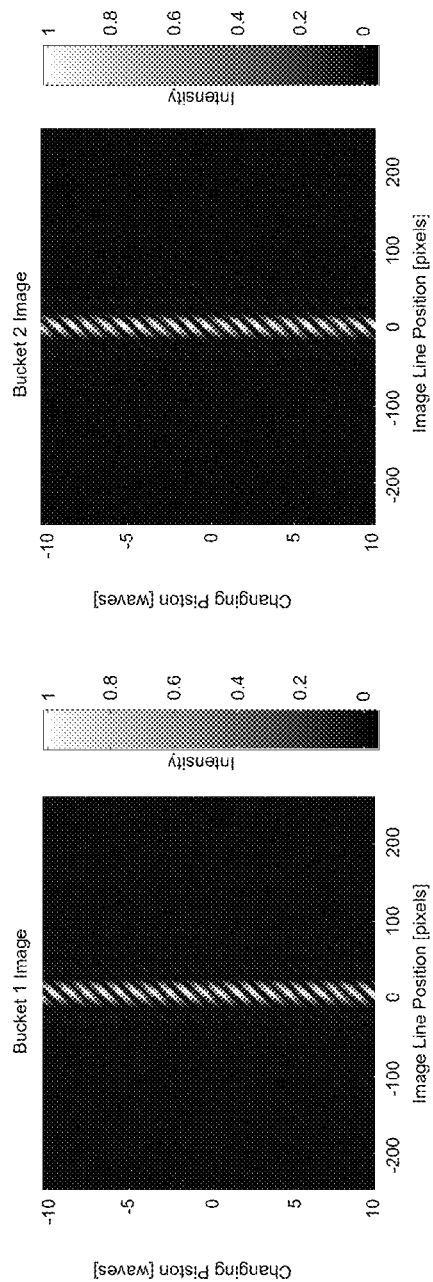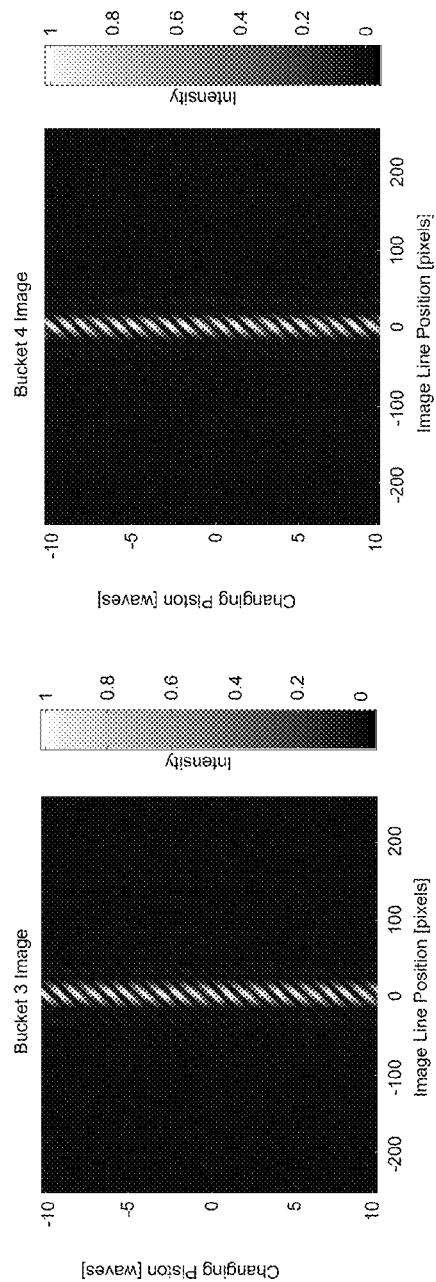
FIG. 3A  FIG. 3B  FIG. 3C  FIG. 3D

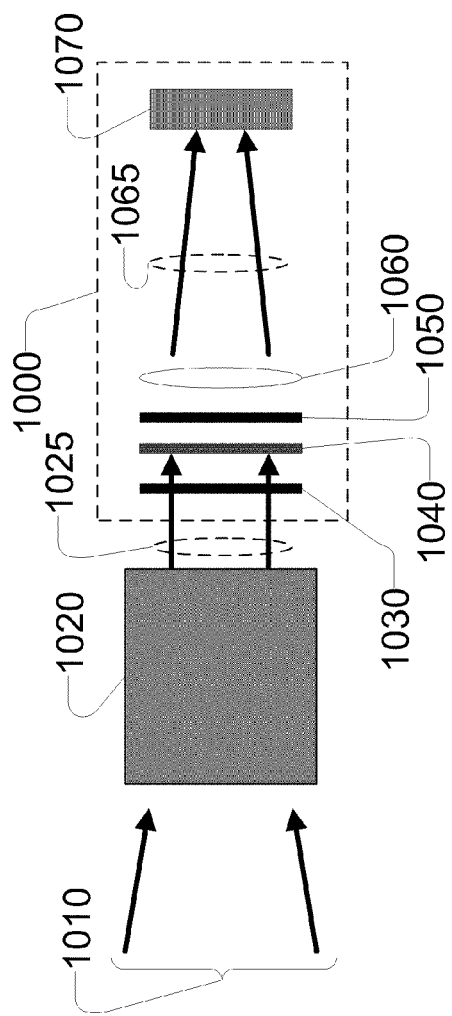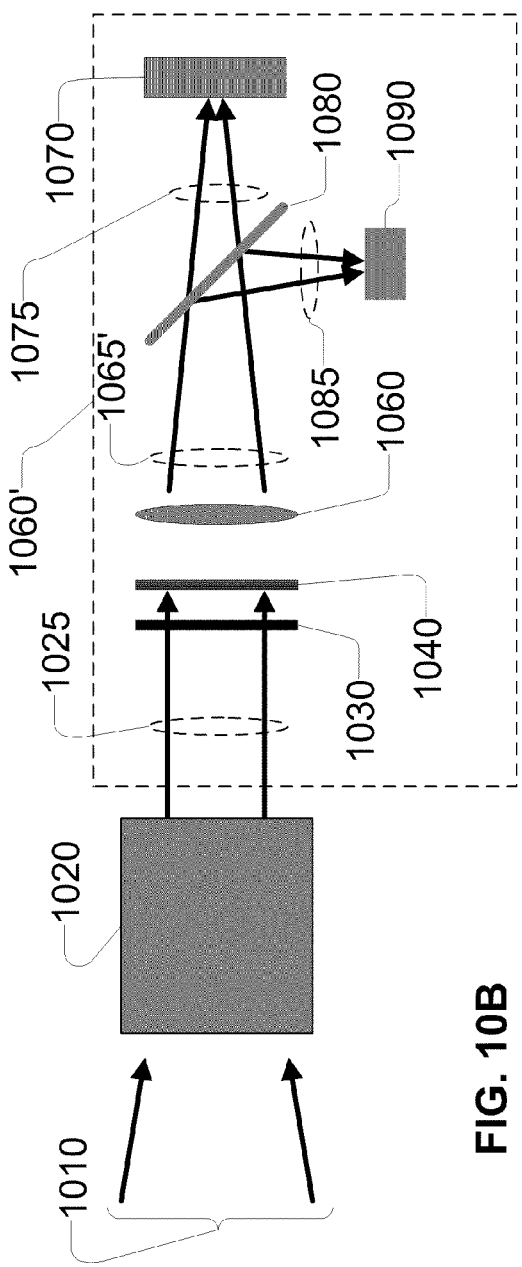

US 7,864,333 B1

POLARIZATION MODULATED IMAGE CONJUGATE PISTON SENSING AND PHASE RETRIEVAL SYSTEM

FIELD OF THE INVENTION

The present invention generally relates to a phase diversity sensor and, more specifically, to a system for detecting and reducing piston error between mirror segments in a segmented mirror array to achieve co-alignment between the mirror segments.

BACKGROUND OF THE INVENTION

Large, single-piece collection optics in telescopes are difficult to is manufacture and suffer from physical instability, e.g., sag. Telescopes making use of large primary mirrors formed from separate mirror segments have been proposed and implemented. Examples of such telescopes include the Keck Telescope.

The mirror segments in a segmented mirror array are desirably co-aligned so as to ensure better imaging. Such co-alignment is referred to as "phasing" and requires the removal of tip, tilt, and piston errors of each segment relative to a reference segment. Because segmented mirror telescopes include multiple, movable segments that may engage in unwanted movement, these systems require persistent alignment between segments to prevent image degradation.

Piston error is more difficult to measure with conventional interferometry than tip and tilt error. The difficulty arises from the periodic nature of monochromatic interference patterns. Monochromatic interference patterns produce an integer number of waves of ambiguity associated with the piston step between mirror segments. The difficulty is also compounded by the fact that piston step should be corrected to high precision.

SUMMARY OF THE INVENTION

In one aspect, an embodiment of the invention comprises a phase diversity sensor system. The system includes a pupil plane mask, a transform optical element, and an image detector. The pupil plane mask includes two or more open mask areas and two or more polarizers. Each polarizer is disposed within a respective one of the open mask areas. A first one of the two or more polarizers has a first polarization orientation, and a second of the two or more polarizers has a second polarization orientation.

In another aspect, an embodiment of the invention comprises a system for detecting piston diversity between mirror segments. The system includes a pupil plane mask, a transform optical element, and an image detector. The pupil plane mask includes two or more open mask areas and two or more polarizers. Each polarizer is disposed within a respective one of the open mask areas. A first one of the two or more polarizers has a first polarization orientation, and a second of the two or more polarizers has a second polarization orientation.

In yet another aspect, an embodiment of the invention comprises a system for co-aligning mirror segments in a telescope. The system includes a telescope, a pupil plane mask, a transform optical element, and an image detector. The telescope includes an array of mirror segments. The array includes a first mirror segment and a second mirror segment. The pupil plane mask includes two or more open mask areas and two or more polarizers. Each polarizer is disposed within a respective one of the open mask areas. A first one of the two or more polarizers has a first polarization orientation, and a second of the two or more polarizers has a second polarization orientation.

BRIEF DESCRIPTION OF THE DRAWINGS

The invention may be understood from the detailed description when read in connection with the accompanying drawings. Included in the drawings are the following figures:

FIGS. 2A-2D illustrate plots of intensity patterns for fringe images for respective first through fourth buckets of the system illustrated in FIG. 1 over a range of piston errors from −1 wave to +1 wave, in accordance with an embodiment of the present invention;

FIGS. 3A-3D illustrate plots of intensity patterns for fringe images for respective first through fourth buckets of the system illustrated in FIG. 1 over a range of piston errors from −10 waves to +10 waves, in accordance with an embodiment of the present invention;

FIGS. 10A-B illustrate embodiments of phase diversity sensor systems employing a pupil plane mask, in accordance with an embodiment of the present invention;

DETAILED DESCRIPTION OF THE INVENTION

Several conventional methods for detecting piston error in mirror segments have been proposed. Examples of such methods are discussed in U.S. Pat. No. 5,120,948 to Wertheimer et al. (herein "the Wertheimer patent") and in Wertheimer, Alan and Tom Dey, "Wide-range, high-accuracy, white light piston sensor for segmented optics" (herein "the Wertheimer paper"), Optical Engineering, Vol. 34, No. 7, July 1995, pp. 2149-2156, the contents of both of which are hereby incorporated by reference in their entirety for all purposes.

One method described in the Wertheimer paper involves a white light radial shearing interferometer that uses an image of a reference segment to overlap and interfere with an image of a test segment. Another method involves lateral shearing interferometry accomplished through white light polarization. For both of these methods, the relative location of a white light fringe indicates the magnitude of piston error. It should be noted that both of these methods use a critically aligned auxiliary optical relay system and sophisticated fringe interpretation software. A third method described in the Wertheimer paper involves the analysis of a point-spread function of an image formed through two sub-apertures. One image is formed from each of the reference and test segments. This third method has been used in a modified Shack-Hartmann test currently used for co-aligning the mirror segments of the Keck Telescope.

The Wertheimer paper also describes a further piston detection method that involves a two-tiered approach. A first tier uses a modified Young's double slit interference technology for coarse piston sensing. A second tier uses another set of apertures for fine piston sensing. The Wertheimer patent describes this method in further detail.

Figure 11:
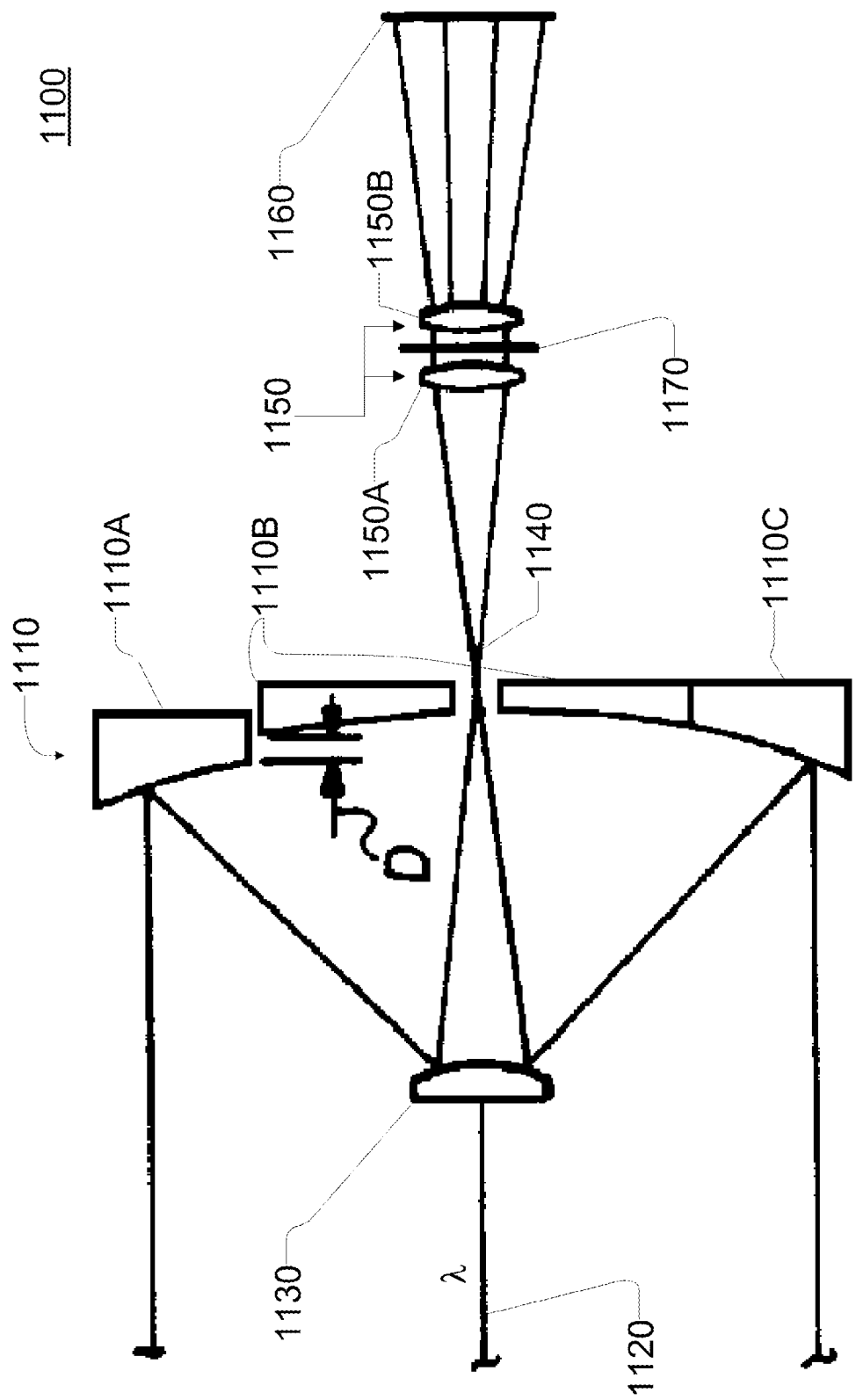
FIG. 11 illustrates a conventional imaging system for detecting piston error between mirror segments.

Referring now to FIG. 11, there is illustrated a conventional white light sensor, generally designated as 1100, that implements the two-tiered approach described in the Wertheimer patent. The white light sensor 1100 is used for testing a plurality of collection optics 1110 that include outer mirror segments 1110A and 1110C and a center mirror segment 1110B. The white light sensor 1100 detects piston error between the segments 1110.

In an exemplary embodiment, the segment 1110B serves as a reference mirror segment, and the segments 1110A and 1110C serve as test mirror segments. The reference mirror segment 1110B and the test mirror segments 1110A and 1110C are physically decoupled imaging components, designed to act in an imaging function as a single, larger monolithic imaging component 1110. The white light sensor 1100 provides a quantitative real-time determination of the piston of the test segment 1110A with respect to the reference mirror segment 1110B. The piston displacement (error) is labeled as D in FIG. 11.

The white light sensor 1100 further includes a conventional polychromatic source of radiation (not illustrated), that provides a collimated, polychromatic radiation beam λ along an assembly optical axis 1120. The collimated beam λ is reflected by the mirror segments 1110, and the light reflected by the mirror segments 1110 is reflected by collection optics 1130 to form an image of the source at a location 1140. The image at the location 1140 is relayed by a set of conventional lenses 1150A and 1150B to a photodetector array (not illustrated) located at a source conjugate image plane 1160. The location of the conventional lenses 1150A and 1150B defines a location of a pupil conjugate image plane 1170 that is the image conjugate of the mirror segments 1110.

The photodetector array (not illustrated) may be a conventional CCD photodetector array. The CCD photodetector array detects an image photon intensity distribution. A subsequent evaluation of the point spread function (PSF) corresponding to the photon intensity distribution detected by the CCD photodetector array may be effected by way of a conventional computer (not illustrated) connected to the CCD photodetector array.

Figure 12:
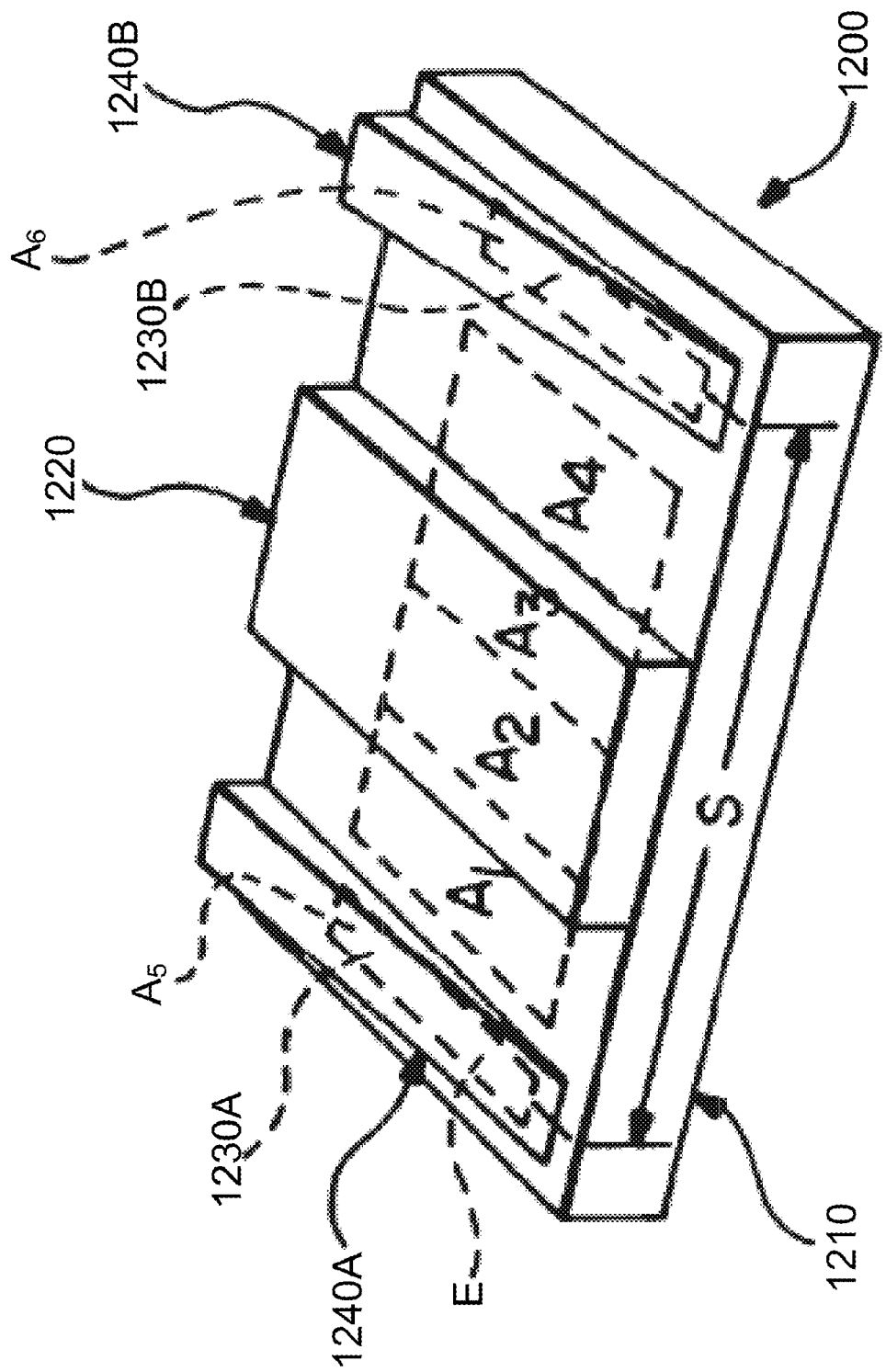
FIG. 12 illustrates a conventional pupil plane imaging mask.

Referring now to FIG. 12, there are illustrated the features of a pupil plane imaging mask, generally designated as 1200, which is located at the pupil conjugate image plane 1170. In general, the imaging mask 1200 simultaneously fulfills a two-fold function: coarse piston sensing by way of two spaced-apart apertures 1230A and 1230B (also respectively labeled as $A_5$ and $A_6$) and fine piston sensing by way of four phase-retardation sub-regions $A_1$, $A_2$, $A_3$, and $A_4$.

The mask 1200 preferably comprises a transparent, homogeneous and uniformly thick substrate 1210 with a "fine alignment" overlay 1220 comprising a thin film coating deposited on the substrate 1210. The overlay 1220 overlaps sub-regions $A_2$ and $A_3$ and is, thus, capable of overlapping top and lower portions of a reference component image and a test component image, respectively. The overlay 1220 introduces a phase retardation in transmission of approximately one-half wave of the radiation of interest.

The apertures 1230A and 1230B each have a preferred rectangular shape E and are separated by a distance S. Elements 1240A and 1240B are disposed atop the respective apertures 1230A and 1230B.

Figure 13A:
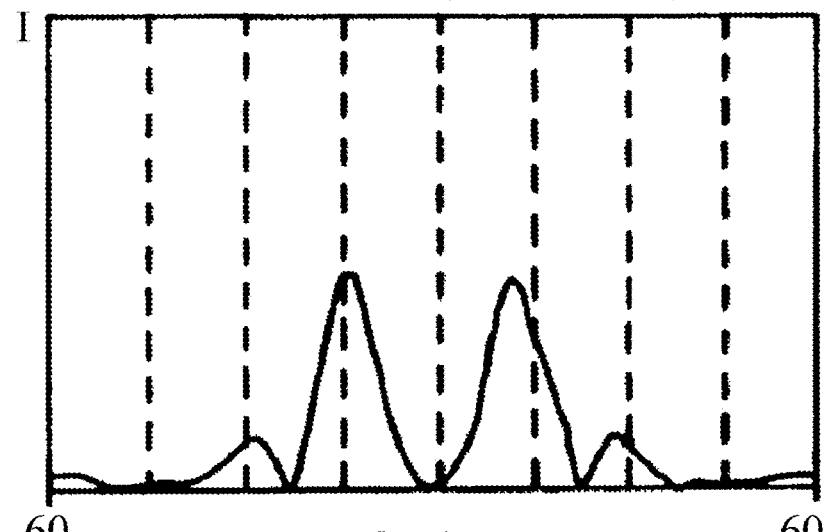
FIG. 13 illustrates conventional point spread functions corresponding to fine piston sensing performed by the conventional imaging system illustrated in FIG. 11.
Figure 13B:
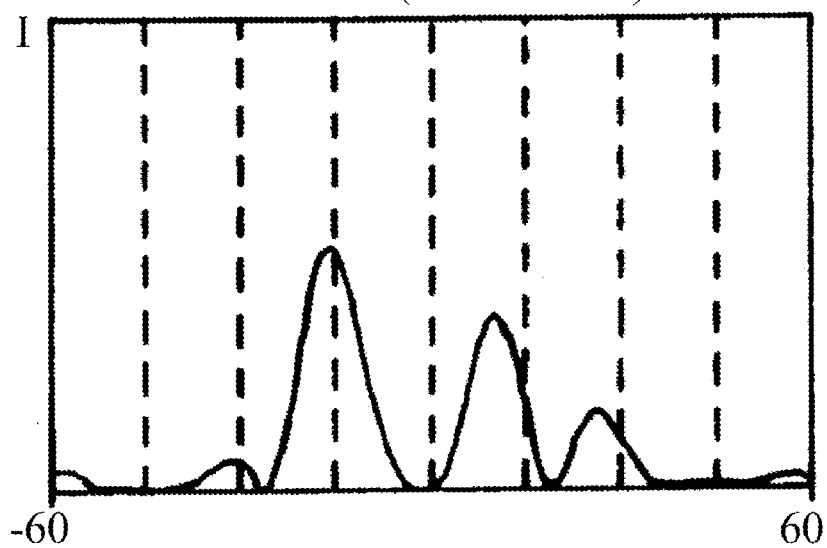

Referring now to FIGS. 13A and 13B, there are illustrated conventional point spread functions associated with fine piston error sensing performed by the sensor 1100. FIGS. 13A and 13B are plots of photon intensity I versus spatial distance (in microns) as measured across the photodetector array. Specifically, FIG. 13A illustrates the point spread function for a piston error of 0 waves, which corresponds to co-alignment between the segments 1110A and 1110B. (Each wave of a piston has an optical path difference corresponding to one wavelength of light. The wavelength is typically in a range between 1 nanometer and 10 millimeters.) FIG. 13B illustrates the point spread function for a piston error of 0.125 waves, which corresponds to non-co-alignment between the segments 1110A and 1110B. Piston error is determined based upon a ratio of the peak intensities of the two major peaks or a ratio of differences of the heights of such peaks to sums of the heights of such peaks.

Figure 14:
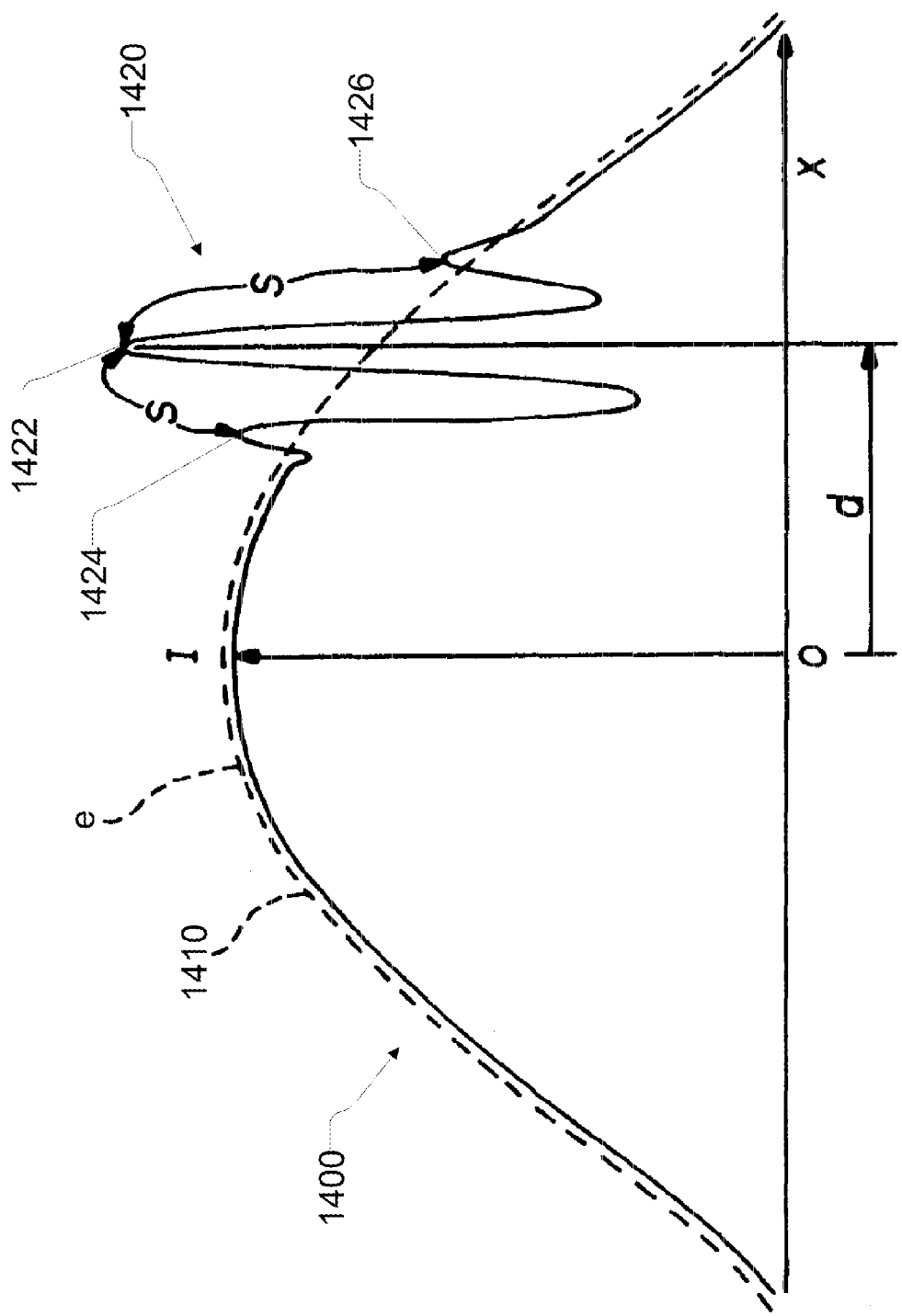
FIG. 14 illustrates conventional plots of point spread functions corresponding to coarse piston sensing performed by the conventional imaging system illustrated in FIG. 11.

Referring now to FIG. 14, there is illustrated a conventional point spread function, generally designated as 1400, associated with coarse piston error sensing performed by the sensor 1100. As with FIGS. 13A and 13B, FIG. 14 is a plot of photon intensity I versus spatial distance (in microns) as measured across the photodetector array. FIG. 14 particularly illustrates a coarse alignment curve 1400 that shows intensity I as a function of spatial position x.

The point spread function 1400, in detail, comprises a broad envelope function e, generally designated as 1410, and a highly modulated region 1420. The highly modulated region 1420 comprises a unique and intense central singularity or spike 1422 flanked by two spaced-apart S lesser spikes 1424 and 1426. The form of the envelope function 1410 is a known characteristic, determined by a known Fourier transform of the geometric shape E of the mask aperture 1230A or 1230B. The spacing S of the spikes 1424 and 1426 from the spike 1422 is a known characteristic, determined by the known geometric spacing S of the mask apertures 1230A and 1230B.

FIG. 14 also denotes a distance parameter d, defined along the x axis from an origin or photometric centroid O to the intense central spike 1422. This distance parameter d is a direct quantitative measure of the sought-for coarse piston of the reference mirror segment 1110A with respect to the test mirror segment 1110B.

For piston sensing, all dual slit or n slit, where n is an integer, piston is sensor systems, such as system 1100, rely on directly locating peak position to indicate the piston in the system. Difficulty in locating the fringe intensity maximum and minimum, such as those illustrated in the piston-error plots illustrated in FIGS. 13 and 14, limits the precision of the technique.

The limitations in the piston sensor noted above can be overcome by employing a phase shifting technique. Phase shifting of a light beam can either be accomplished by sequentially introducing a phase step (temporal phase shifting) or by splitting the beam into parallel channels for simultaneous phase steps (spatial phase shifting). Spatial phase shifting achieves data acquisition in a time several orders of magnitude less than temporal phase shifting, thus offering significant immunity to vibration.

Figure 1:
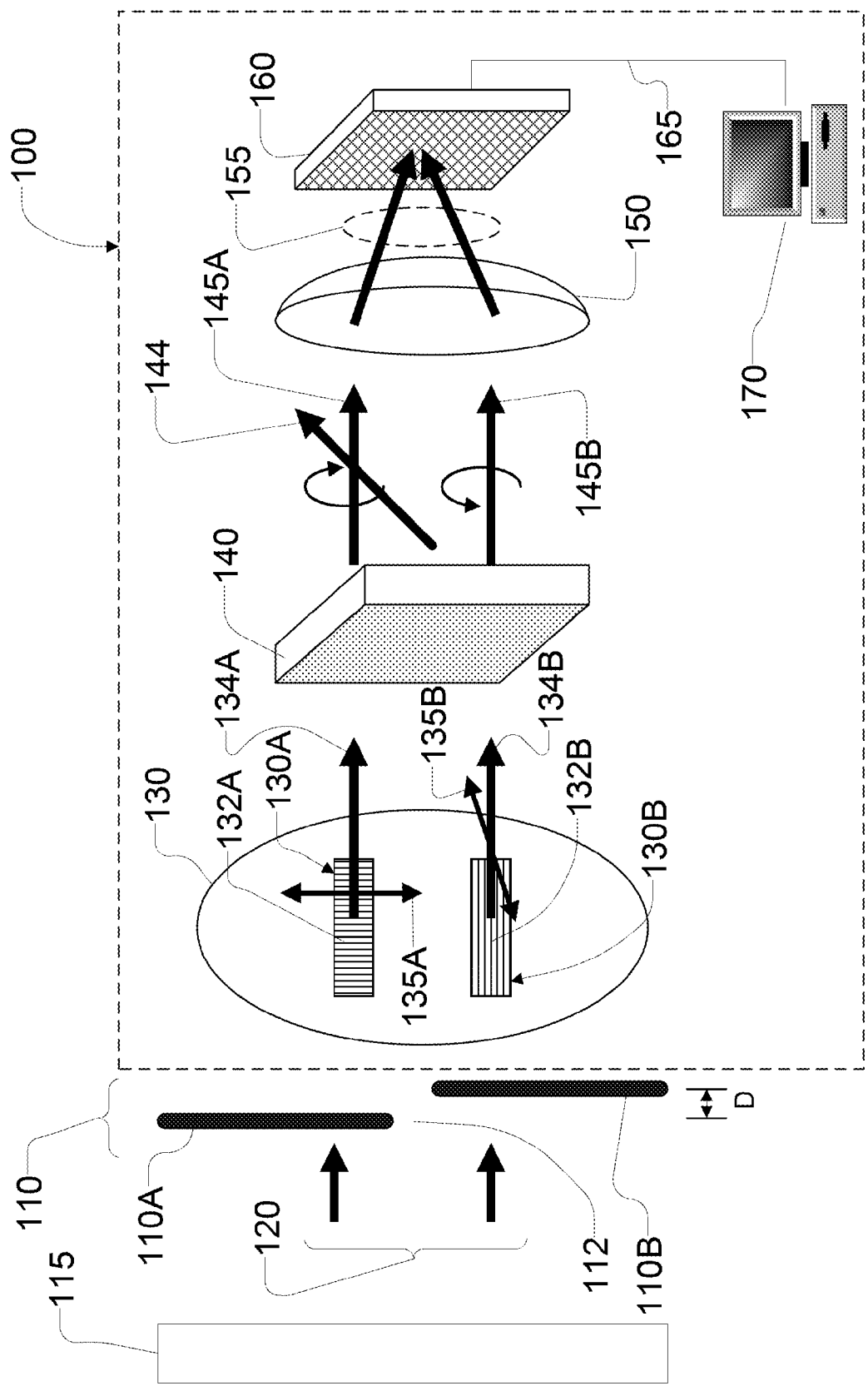
FIG. 1 is an illustration of an embodiment of a system for detecting piston error of adjacent mirror segments, the system including an image analyzer and a pupil plane mask having apertures in which polarizers orthogonal to one another are disposed, in accordance with an embodiment of the present invention.

Referring now to FIG. 1, there is illustrated a piston sensor system, generally designated as 100, in accordance with an exemplary embodiment of the present invention. The piston sensor system 100 includes a segment-aligned polarization pupil mask (PPM) 130, a quarter-wave plate (QWP) 140, a transform (imaging) lens 150, an image analyzer 160, and a computer 170. The system 100 uses spatial phase shifting to detect piston error in a pair of mirror segments (not illustrated) in imaging optics 115, thereby offering significant immunity to vibration when detecting piston error. The mirror segments are part of a segmented optical imaging assembly (included as part of the imaging optics 115). One example of representative mirror segments is 1110A-1110C in FIG. 11. In some instances the system 100 may be used for detecting piston with segmented optics even when the segmented optics are not part of the imaging system 115 such as during integration and test or while evaluating an external optical component.

The imaging optics 115 provide real images 110 of the pair of mirror segments. The images 110 include an image 110A of a first mirror segment of the pair of mirror segments and an image 110B of a second mirror segment of the pair of mirror segments. The images 110 are carried in a polychromatic beam of light 120 to the piston sensor system 100.

As illustrated in FIG. 1, the images 110 of the mirror segments include a wavefront error produced when the mirror segments are not co-aligned, i.e., when there exists a piston error, designated as D, between the mirror segments. The system 100, as discussed below, is configured to measure D.

The light 120 carrying the images 110 intersects the PPM 130. The PPM 130 includes open mask areas (apertures or slits) 130A and 130B in which are situated respective linear polarizers 132A and 132B, which polarize the light of the beam 120. The area of the PPM 130 outside the open mask areas 130A and 130B is opaque and blocks all of the light 120 incident to the PPM 130, except for a portion that passes through the polarizers 132A and 132B of the respective apertures 130A and 130B. The light transmissions polarized by the polarizers 132A and 132B are designated, respectively, as 134A and 134B.

The polarizers 132A and 132B are aligned to be orthogonal to one another such that the polarization of the light 134A is orthogonal to the polarization of the light 134B. The polarization orientation of the polarized light 134A is indicated by an arrow 135A in FIG. 1, and the polarization orientation of the polarized light 134B is indicated by an arrow 135B. (It is to be understood that the polarization orientations 135A and 135B also indicate the transmission axes of the respective polarizers 132A and 132B.) The light 134A and 134B interfere with one another to form a fringe pattern or image with a phase offset. In an exemplary embodiment, the polarizers 132 may be made from nano wires (such as Proflux™ polarizers produced by Moxtek Inc.), birefringent crystals, liquid crystal materials, birefringent polymer films, a spatial light modulator or a polarizing beam splitter cube. Liquid crystal materials may provide direct separation of orthogonal circular polarization. In some embodiments additional wavelength selection filters may be used.

The PPM 130 is aligned with the gap between the pair of mirror segments so that the polarizers 132A and 132B are symmetrically disposed about the gap. Hence, the PPM 130 is a "segment-aligned PPM." The PPM 130 is placed at a pupil conjugate plane of the system 100.

Following the PPM 130 is the QWP 140 which includes an extraordinary axis indicated in FIG. 1 by an arrow 144. The effect of the QWP 140 is to provide counter rotating polarization states for the light 135A and 135B passed through the QWP 140 as the light 145A and 145B. The extraordinary axis 144 of the QWP 140 is oriented to bisect the angle between the orthogonal polarization orientations 135 for the polarized light 145A and 145B.

As described below, the phase offset detected by the image analyzer 160 varies and is linearly dependent on the orientation of polarization transmission axes of the image analyzer 160. The phase offset (phase difference) is induced by the difference in lag for the vertical and horizontal components, as seen through the image analyzer 160. The lag difference is inherent in the left handed and right handed polarization states of the light 145A and 145B and is due to the QWP 140.

The QWP 140 is followed by the transform (imaging) lens 150 and the image analyzer 160. The transform lens 150 delivers an optical signal that has the intensity of the Fourier transform of the pupil of the system 100 to the image analyzer 160 (the PSF in this example). The polarizers 132, QWP 140, and the image analyzer 160 provide for diversity in the phase of the pupil. As such, the system 100 is a phase diversity sensor. It is to be understood that the position of the QWP 140 between the PPM 130 and the transform lens 150 is not so constrained. The QWP 140 may be positioned at any point in the system 100 between the polarizers 132 and the image analyzer 160.

The term "phase diversity sensor" is used to describe a system that recovers the pupil function of a system (phase and possibly amplitude) using at least two images of point sources or extended objects where there is a relative change in some part of the pupil phase induced between the images. A phase diversity sensor finds more application in "on board" telescope metrology than do conventional interferometers, for which the image of a pupil is relayed directly to a sensor to produce an interferogram that is a point by point map of the pupil (resulting in a "wavefront map"). Such conventional interferometers require additional pupil imaging optics or sensors and a contiguous reference beam that co-propagates with a full aperture test beam to produce the interferogram. Compared to an interferometer, a phase diversity sensor requires fewer optical components and does not require a reference beam.

The transform lens 150 focuses the light 145 as light 155 on the image analyzer 160. As noted earlier the transform lens acts to create an image that has the intensity of the Fourier transform of the pupil (in this example, the pupil as limited by the slits), not the pupil itself as would be the case with a conventional interferometer. In an exemplary embodiment, the system 100 uses an optical element other than the lens 150 for delivering an optical signal that has the intensity of the Fourier transform of the pupil of the system 100 to the image analyzer 160. An example of such an optical element is a transform mirror.

As discussed below, the image analyzer 160 detects four interleaved intensity images ($I_1$, $I_2$, $I_3$, and $I_4$) having four unique phases due to the pixilated polarizer in the image analyzer 160. The four intensity images are the product of a fringe pattern, produced by the light passing through the polarizers 132 and the QWP 140 and provided to the image analyzer as the light 155, being sensed by the image analyzer 160 having four pixilated polarizer orientations. In an exemplary embodiment, the relative phase shift between the four intensity images is 0 radians, $\pi/2$ radians, $\pi$ radians, and $3\pi/2$ radians. Each phase may be referred to as a "bucket."

The image analyzer 160 is configured to detect intensity patterns at a plurality of phase shifts of the light 155 incident thereto. The image analyzer 160 comprises a polarization analyzer (not separately illustrated in FIG. 1) and an image detector (not separately illustrated in FIG. 1). In an exemplary embodiment, the polarization analyzer is one of (1) a micro polarizer array, (2) a rotation linear polarizer, (3) an arrangement of one or more polarizing beam splitters, or (4) a diffractive beam splitter. The polarization analyzer is disposed between the image detector and the transform lens 150. The polarization analyzer thus disposed acts as a relative phase shifting device with respect to the orthogonally polarized light (134A and 134B) that passes through the apertures 132A and 132B.

Figure 1A:
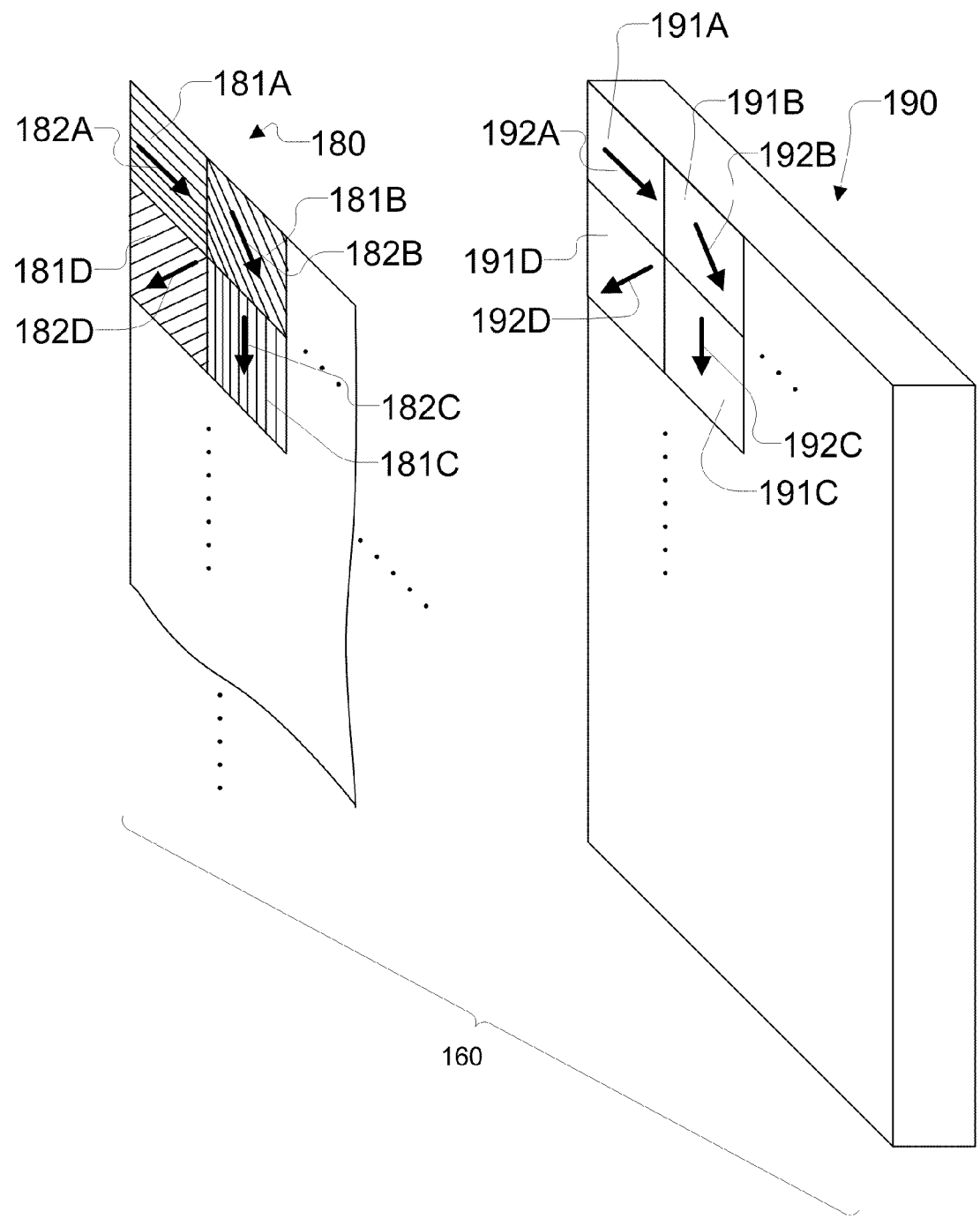
FIG. 1A is an illustration of an exemplary embodiment of the image analyzer of FIG. 1, in accordance with an embodiment of the present invention.

FIG. 1A illustrates an exemplary embodiment of the image analyzer 160, in accordance with an exemplary embodiment of the present invention. The embodiment of the image analyzer 160 illustrated in FIG. 1A includes a pixilated polarizer mask 180 and a pixilated image detector 190. The pixilated polarizer mask 180 is a micro polarizer array constructed from an array of nano-wire polarizers. The pixilated polarizer mask 180 is laid out in a checkerboard configuration with repeating patterns of 2×2 groups of micropolarizers. Each 2×2 group comprises four unique polarization orientations. In an exemplary embodiment, the four orientations are 0, 45, 90, and 135 degrees, respectively designated as 182A, 182B, 182C, and 182D.

The four polarizers in each 2×2 group in the pixilated polarizer mask 180 are aligned to a respective 2×2 group of pixels in the image detector 190, such that each polarizer pixel is aligned with a respective detector pixel not aligned with any other polarizer pixel. For example, a polarizer pixel 181A is aligned to a respective detector pixel 191A; a polarizer pixel 181B is aligned to a respective detector pixel 191B; a polarizer pixel 181C is aligned to a respective detector pixel 191C; and a polarizer pixel 181D is aligned to a respective detector pixel 191D. Each detector pixel has an orientation (detector angle) for sensing light of a particular phase, e.g., 0, 45, 90, and 135 degrees, respectively designated as 192A, 192B, 192C, and 192D.

As can be seen in FIG. 1A, the polarizer pixels 181A-D form a 2×2 group, and the detector pixels 191A-D form a 2×2 group. The pixilated polarizer mask 180 and the image detector 190 include repeating 2×2 groups aligned with one another in the same fashion that the group of polarizer pixels 181 is aligned to the group of detector pixels 191.

As noted above with relation to FIG. 1, the polarization analyzer may also be embodied as one or more polarizing beam splitters or a diffractive beam splitter that provides four copies of an image of the fringe pattern. In such embodiments, each of the four copies of the image are formed in a separate quadrant in the image detector. Each quadrant employs a detector at a different angle to detect the image projected on it. The angle of each detector measured clockwise from the horizontal axis in the horizontal/vertical plane (nominally orthogonal to the optical axis of the detector optics) is the detector angle. A change in detector angle provides a corresponding change in the relative phase.

Further, it is to be understood that, although the system 100 is illustrated as using a single image analyzer 160, it is to be understood that it may use multiple image analyzers for analyzing fringe patterns generated from multiple mirror segments. Further, it may use separate image analyzers for imaging light of differing detector angles.

With continued reference to FIG. 1 and the exemplary embodiment of the image analyzer 160 illustrated in FIG. 1A, the fringe pattern (the light 155) is polarized by the pixilated polarizer mask 180 and projected onto the image detector 190. As described above with reference to FIG. 1A, the four polarizers in each 2×2 group in the pixilated polarizer mask 180 are aligned to a respective 2×2 group of pixels in the image detector 190. Each pixel in a 2×2 group of detector pixels is configured to detect light of a particular phase, i.e., each of such pixels has a particular angle. Because of such arrangement of detector pixels, a continuous fringe pattern for each of the four phases of light is not detected, i.e., the detected intensity images $I_1$, $I_2$, $I_3$, and $I_4$, are not continuous from detector pixel to detector pixel, as each pixel detector detects the intensity of light having a particular phase only, not all four phases. Thus, each intensity image is interpolated to form an intensity image of continuous sample points.

Specifically, the image analyzer 160 outputs the intensity (or image data) of each pixel to the computer 170. The computer 170 interpolates the intensity images to form four intensity images of common sample points. The computer 170 uses the four interpolated intensity images to recover the phase at each point in the image detector 190 per equation 1:

$$\text{phase} = \tan^{-1}\left[\frac{I_4 - I_2}{I_1 - I_3}\right] \quad (1)$$

The computer 170 determines the centroid location of the sum of the four intensity images using a center of mass calculation and ascertains the phase at this location. Using this ascertained phase, the computer determines the piston error. More sophisticated techniques such as envelope fitting, spatial averaging, or maximum likelihood estimation are contemplated as alternatives to determining the centroid. Determining the centroid is relatively simple and noise insensitive compared to determining individual fringe intensity maximum and minimum.

Figure 1B:
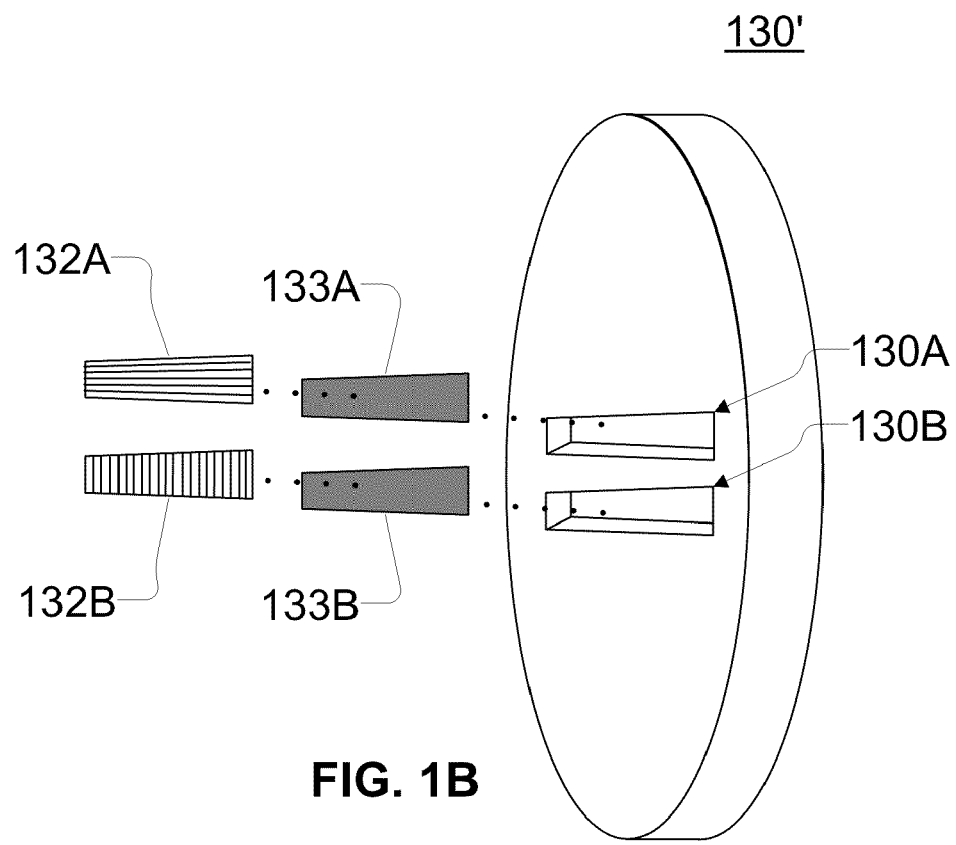
FIG. 1B is an illustration of an exemplary embodiment of the pupil plane mask of FIG. 1, in accordance with an embodiment of the present invention.

Other embodiments of the system 100 are now described. In a first further embodiment of the system 100, the system 100 does not include a separate QWP 140 disposed between the PPM 130 and the transform lens 150. Instead, one or more QWPs are incorporated into the PPM 130. FIG. 1B illustrates an exploded view of such an embodiment of such a PPM, generally designated as 130'. Like elements in FIG. 1B are labeled identically to corresponding elements in FIG. 1.

In the PPM 130', a QWP 133A is disposed in the open mask area 130A in addition to the linear polarizer 132A, and a QWP 133B is disposed in the open mask area 130B in addition to the linear polarizer 132B. The polarizer 132A and the QWP 133A are arranged in the open mask area 130A so that light polarized by the polarizer 132A then passes through the QWP 133A. Further, the polarizer 132B and the QWP 133B are arranged in the open mask area 130B so that light polarized by the polarizer 132B then passes through the QWP 133B.

The PPM 130' may be used in place of the separate PPM 130 and QWP 140 in the system 100, as it performs the combined functions of the separate PPM 130 and QWP 140. In other words, it polarizes and counter rotates light incident thereto. The PPM 130' is optically disposed within the system 100 with the polarizers 132 optically facing the imaging optics 115, e.g., the mirror segments, and the QWPs 133 optically facing the transform lens 150.

It is to be understood that variations of the PPM 130' are possible. For example, the QWPs 133 may be omitted from the open mask areas 130A and 130B and a QWP may instead be secured to the surface of the PPM 130' optically facing the transform lens 150. Or, the separate linear polarizers and QWPs, e.g., the polarizers 132 and the QWPs 133, may be replaced with circular polarizers.

Figure 1C:
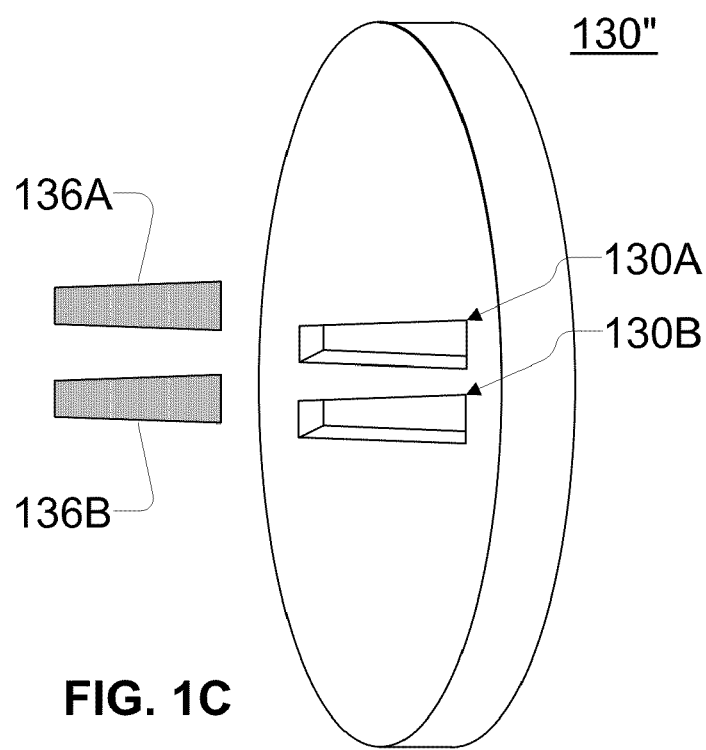
FIG. 1C is an illustration of another exemplary embodiment of the pupil plane mask of FIG. 1, in accordance with an embodiment of the present invention.

FIG. 1C illustrates an exploded view of such a variation of the PPM 130', generally designated as 130". PPM 130" does not include linear polarizers combined with QWPs. Rather, a first circular polarizer 136A is disposed within the open mask area 130A, and a second circular polarizer 136B is disposed within the open mask area 130B. The circular polarizers 136 perform circular polarization of light incident to the PPM 130" in counter rotating directions. The PPM 130", thus, may be used in place of the separate linear polarizers 132 and QWP 140 in the system 100 or the separate linear polarizers 132 and QWPs 133 illustrated in FIG. 1B. In an exemplary embodiment, the circular polarizers 136 are made from a circularly polarizing liquid crystal material, such as Chelix Tech Corp. CLC polymer circular polarizers.

Referring now to FIGS. 2A-2D, there are illustrated exemplary simulated fringe images for each of the four buckets sensed by the image analyzer 160. The fringe images are a function of relative segment-to-segment piston, e.g., the piston error between the mirror segments of the imaging optics 115.

Each of FIGS. 2A-2D shows the intensity of a fringe pattern for a plurality of piston errors spanning from −1 wave to +1 wave. The result is a "barber pole" effect for each bucket as piston varies in the figures. It should be understood that FIGS. 2A-2D do not illustrate the intensity images sensed by the image analyzer 160 at one point in time as only one piston value exists at a particular point in time for a pair of mirror segments. Instead, each intensity image sensed by the image analyzer 160 is a one-dimensional image corresponding to a single piston offset. Hence, a sensed intensity image is represented in a row slice of the barber poles illustrated in FIGS. 2A-2D.

Each of FIGS. 3A-3D shows the intensity of a fringe pattern for a plurality of piston errors spanning a greater range than that for FIGS. 2A-2D. Specifically, FIGS. 3A-3D illustrate the fringe patterns for each of four buckets caused by the relative piston error of the mirror segments of the imaging optics 115 ranging from −10 waves to +10 waves. Hence, the "barber pole" effect in FIGS. 3A-3D is more pronounced than that of FIGS. 2A-2D.

Figure 4B:
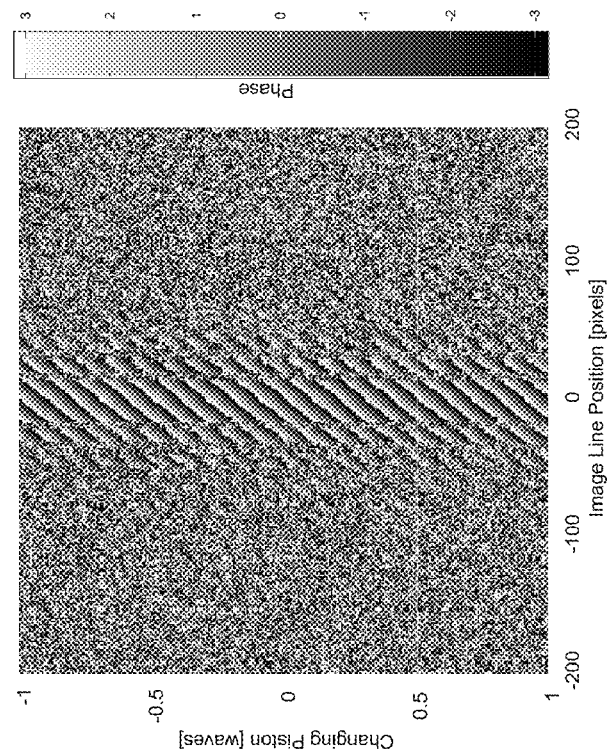
FIG. 4B illustrates the phase recovered from the fringe images illustrated in FIGS. 3A-3D, in accordance with an embodiment of the present invention.
Figure 4A:
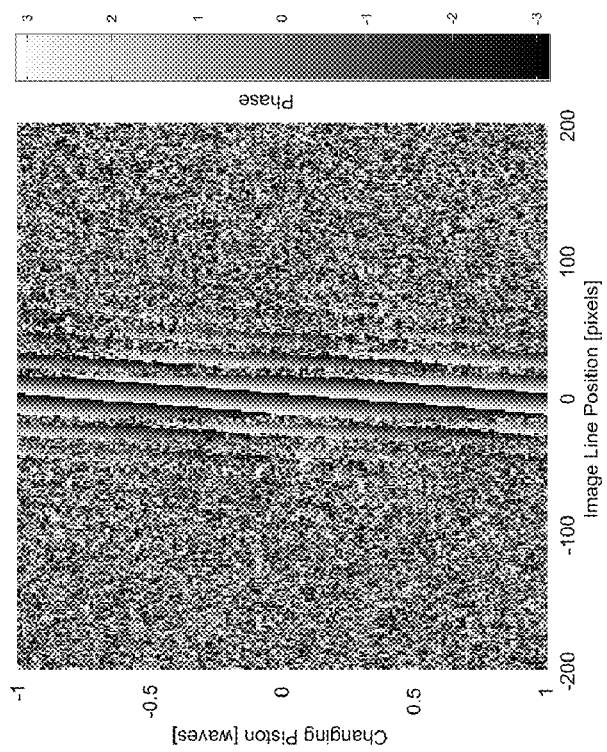
FIG. 4A illustrates the phase recovered from the fringe images illustrated in FIGS. 2A-2D, in accordance with an embodiment of the present invention.

The recovered phases (recovered according to equation 1) in radians corresponding to the simulated data illustrated in FIGS. 2A-2D and FIGS. 3A-3D are depicted in respective FIGS. 4A and 4B over a range of piston, in accordance with an exemplary embodiment of the present invention. Specifically, FIG. 4A illustrates the recovered phase for a range of −1 wave to +1 wave, and FIG. 4B illustrates the recovered phase for a range of −10 waves to +10 waves, where each wave is 632.8 nm. As described above, piston is determined from the value of the phase data at the centroid of the sum of the four intensity images. It should be understood that, because the fringe patterns are approximately one-dimensional images in actuality, the recovered phases for the fringe patterns form a one-dimensional image corresponding to a particular piston. The calculation of the centroid of the sum of the four intensity images and the ascertainment of the phase at the centroid determines the piston. FIGS. 4A and 4B illustrate how the recovered phases vary as piston is changed.

Figure 5:
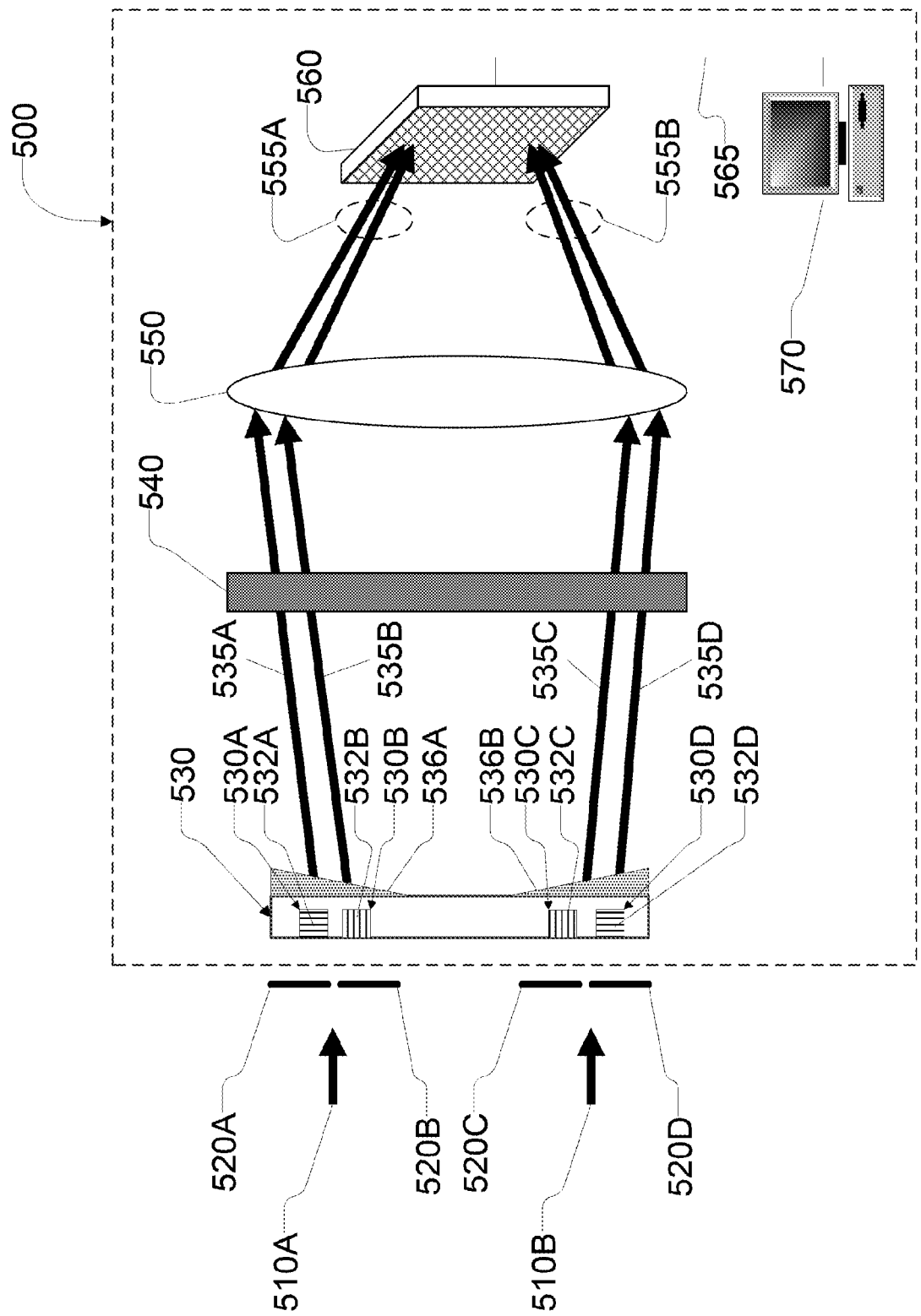
FIG. 5 is an illustration of another embodiment of a system for detecting piston error of adjacent mirror segments, the system including a pupil plane mask having wedges and apertures, e.g., slits, in which polarizers orthogonal to one another are disposed, in accordance with an embodiment of the present invention.

In an exemplary embodiment, the piston sensing system 100 is modified to include one or more dispersive elements, e.g., gratings, prisms, or grisms, to spread out the multi-spectral light (broad band or white) passing through the PPM 130. The light is spread out in a direction parallel to the open mask areas in the PPM 130. In other words, the light is spread out in a direction orthogonal to the diffraction caused by the open mask areas. An example of such a piston sensing system is illustrated in FIG. 5 as a system 500. As described in greater detail below, in the system 500, wedges 536 spread light to provide spatial separation in the detection of piston (vertically in the plane of the illustration) for the two pairs of segments while simultaneously a grating (not illustrated) on each wedge provides spectral dispersion in a direction out of the plane of the page with respect to the illustration.

Referring now to FIG. 5, there is illustrated another embodiment for a piston sensing system, generally designated as 500, in accordance with an exemplary embodiment of the present invention. The system 500 includes a PPM 530, a QWP 540, a transform lens 550, an image analyzer 560, and a computer system 570.

Illustrated in FIG. 5 are real images 520A and 520B of a first pair of mirror segments (not illustrated) and real image 520C and 520D of a second pair of mirror segments (not illustrated). A polychromatic beam of light 510A provides the real images 520A and 520B to the system 500, and a polychromatic beam of light 510B provides the real images 520C and 520D to the system 500. The light 510 enters the piston error detection system 500 and intersects the PPM 530. In an exemplary embodiment, the beams of light 510 originate from a common distant point source.

The PPM 530 includes open mask areas (apertures or slits) 530A and 530B in which are situated respective polarizers 532A and 532B, which polarize the light from the beam 510A carrying the images 520A and 520B. The PPM 530 also includes open mask areas (apertures or slits) 530C and 530D in which are situated respective polarizers 532C and 532D, which polarize the light from the beam 510B carrying the images 520C and 520D. The area of the PPM 530 outside the open mask areas 530 is opaque. The PPM 530 is placed at a pupil conjugate plane of the system 500 and is segment aligned to the first and second pairs of mirror segments.

The opaque area of the PPM 530 blocks most of the light 510, but a portion passes through and is polarized by the polarizers 532A-532D of the respective open mask areas 530A-530D. The light polarized by the polarizers 532A and 532B is designated, respectively, as 535A and 535B, and the light polarized by the polarizers 532C and 532D is designated, respectively, as 535C and 535D.

The polarizers 532A and 532B are aligned to be orthogonal to one another, and the polarizers 532C and 532D are aligned to be orthogonal to one another. As a result, the polarizations of components of transmitted light 535A and 535B are orthogonal to one another, and the polarizations of components of the transmitted light 535C and 535D are orthogonal to one another. The light 535A and 535B interfere with one another to form a fringe pattern or image, and the light 535C and 535D interfere with one another to form another fringe patter or image.

The PPM 530 also includes wedges 536A and 536B that displace the fringe patterns generated from the apertures in the PPM 530. The fringe patterns are displaced in a direction parallel to the direction of the apertures 530, i.e., vertically in the plane of the figure. Thus, the wedges 536A and 536B provide for spatial separation between the fringe patterns. In an exemplary embodiment, each wedge 536A and 536B is provided with a grating (not illustrated) to provide spectral dispersion in a direction out of the plane of the figure. The displaced light 535A-535D (fringe patterns), with or without spectral dispersion, passes through the QWP 540 and is focused by the transform lens 550 on the image analyzer 560 as light 555A and 555B.

The use of the wedges 536 enables the simultaneous reading of multiple slit interference patterns on a single image analyzer, such as the image analyzer 560, without overlap. In an exemplary embodiment, the image analyzer 560 may be embodied as a polarization analyzer and an image detector, such as that discussed with reference to FIGS. 1 and 1A.

The computer system 570 receives the intensity data for the fringe patterns from the image analyzer 560 via a bus 565, interpolates that data to common image sample points, recovers the phase, and determines the piston error using the procedure of the computer system 170 discussed above. It is to be understood that because the system 500 includes two pairs of mirror segments (represented by images 520), eight fringe patterns are sensed by the image analyzer 560 and processed by the computer system 570.

Figure 5A:
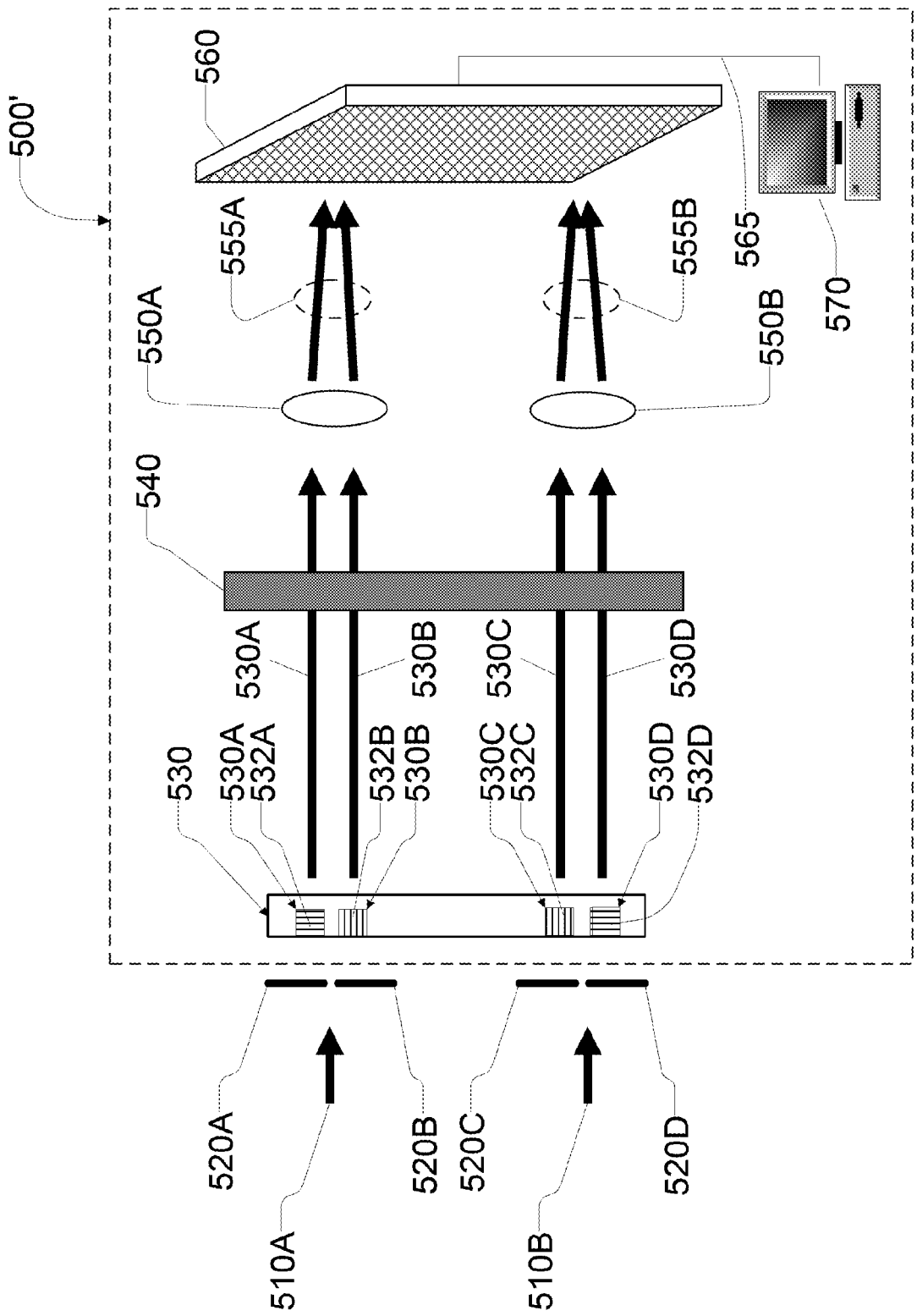
FIG. 5A is an illustration of yet another embodiment of a system for detecting piston error of adjacent mirror segments, the system including a plurality of transform lenses and a pupil plane mask having pairs of apertures in which polarizers are disposed, each transform lens corresponding to a respective pair of apertures, in accordance with an embodiment of the present invention.

Referring now to FIG. 5A, there is illustrated yet another embodiment of a piston sensing system, generally designated as 500', in accordance with an exemplary embodiment of the present invention. Like elements in FIG. 5A are labeled identically to corresponding elements in FIG. 5. As can be seen if FIG. 5A, the system 500' does not use the wedges 536 of the system 500 to displace the fringe patterns. Rather, it uses an array of transform lenses 550A and 550B that provides for separation between the fringes focused on the image analyzer 560.

Figure 6A:
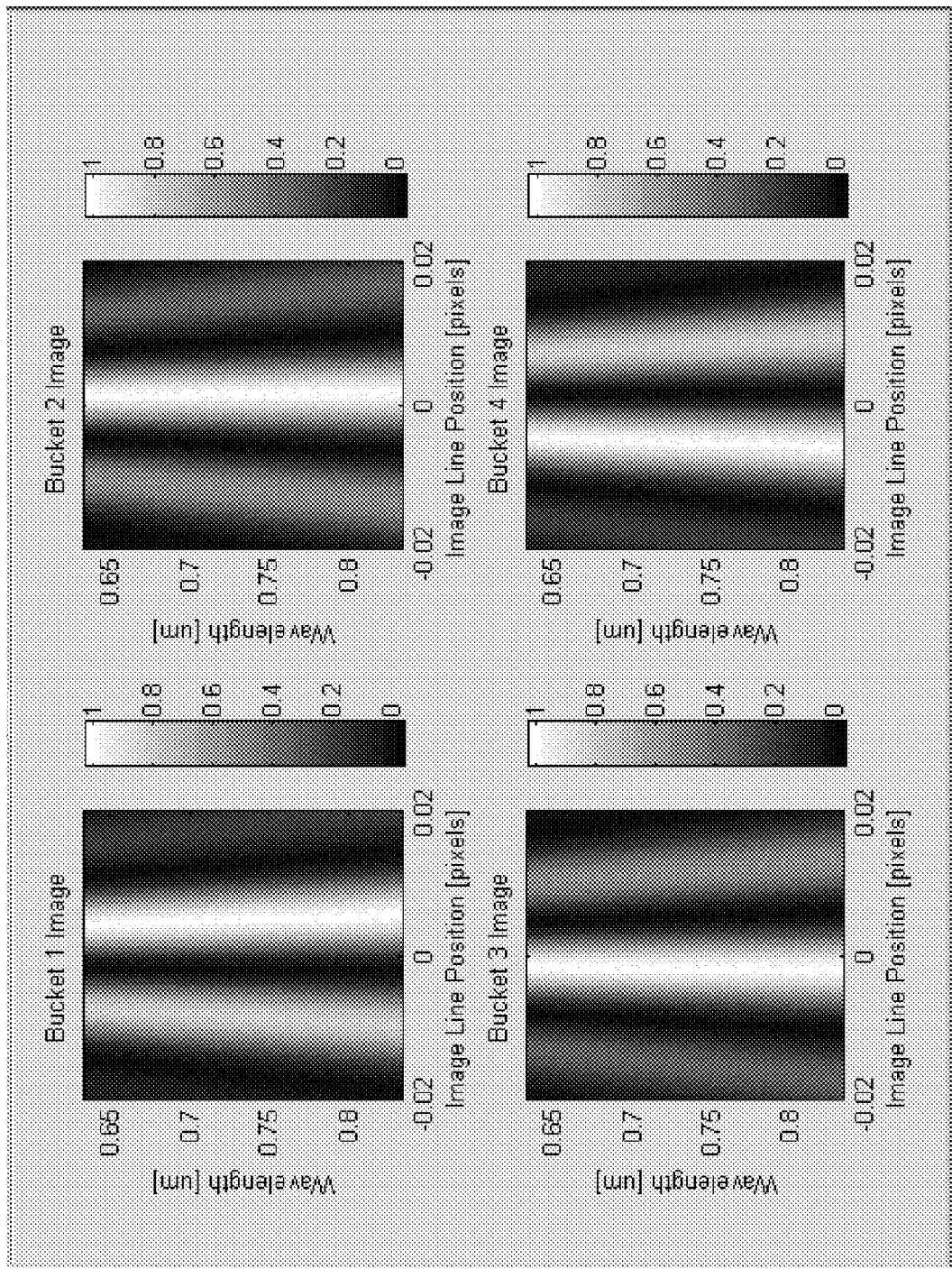
FIG. 6A illustrates plots of intensity patterns for spread-out fringe patterns for respective first through fourth buckets, the fringe patterns corresponding to a fixed piston error of 0 waves, in accordance with an embodiment of the present invention.

Referring now to FIG. 6A, there are illustrated exemplary two-dimensional fringe images for each of the four buckets for the embodiments of the piston sensing systems, e.g., the system 500, employing the one or more spectral dispersive elements discussed above, in accordance with an exemplary embodiment of the present invention. The images illustrate the intensity of each wavelength at various line positions on the image analyzers in such systems at a fixed piston of 0 waves.

Figure 6B:
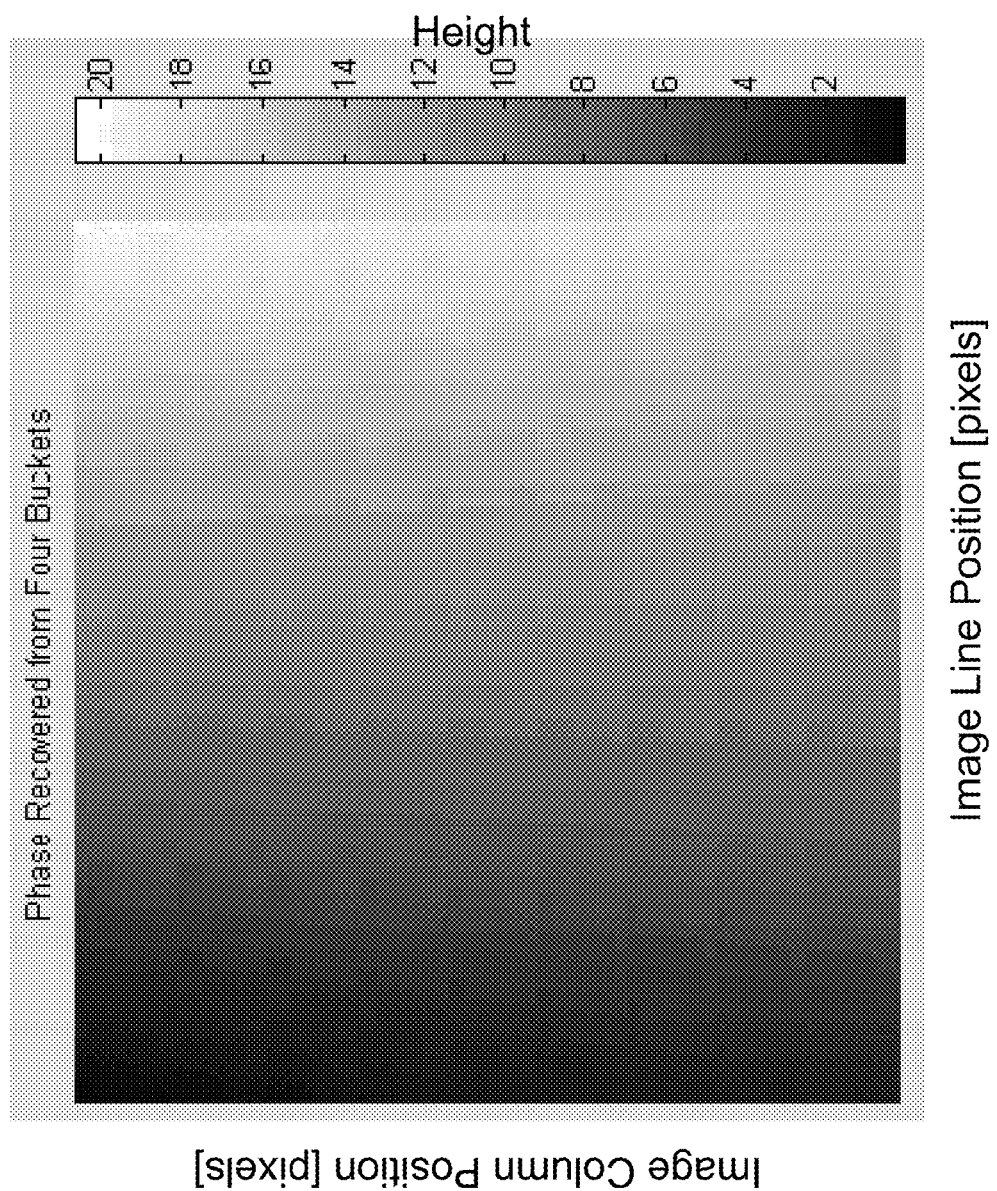
FIG. 6B illustrates the phase recovered from the fringe patterns illustrated in FIG. 6A, in accordance with an embodiment of the present invention.

FIG. 6B illustrates a phase map reconstructed from the data illustrated in FIG. 6A, in accordance with an exemplary embodiment of the present invention. Two-dimensional unwrapping is used as a post process after equation (1) is used to recover the phase map illustrated in FIG. 6B. The phase map, which is computed by the computer system 170 or 570, is recovered as a grayscale spectrum. The shades of gray represent different heights, i.e., recovered phases. The direction of maximum slope for the recovered phase map is indicative of the piston.

Figure 7A:
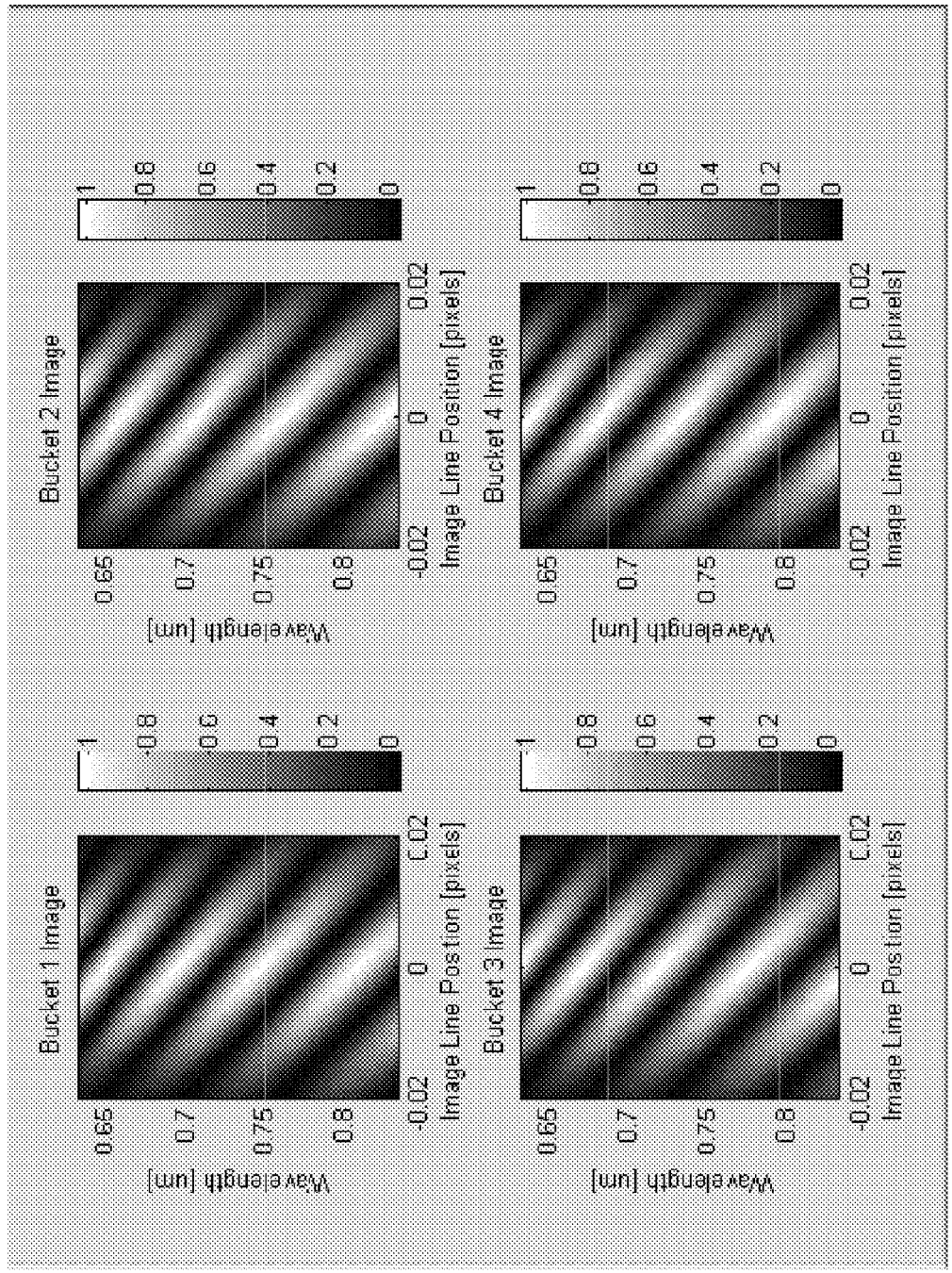
FIG. 7A illustrates plots of intensity patterns for spread-out fringe is patterns for respective first through fourth buckets, the fringe patterns corresponding to a fixed piston error of 10 waves, in accordance with an embodiment of the present invention.

Referring now to FIG. 7A, there are illustrated exemplary two-dimensional fringe images for each of the four buckets for the embodiments of the piston sensing systems, e.g., the system 500, employing the one or more dispersive elements discussed above, in accordance with an exemplary embodiment of the present invention. The images correspond to a fixed piston error of 10 waves. As with FIG. 6A, the images in FIG. 7A illustrate the intensity of each wavelength at various line positions on the image analyzer in such system.

Figure 7B:
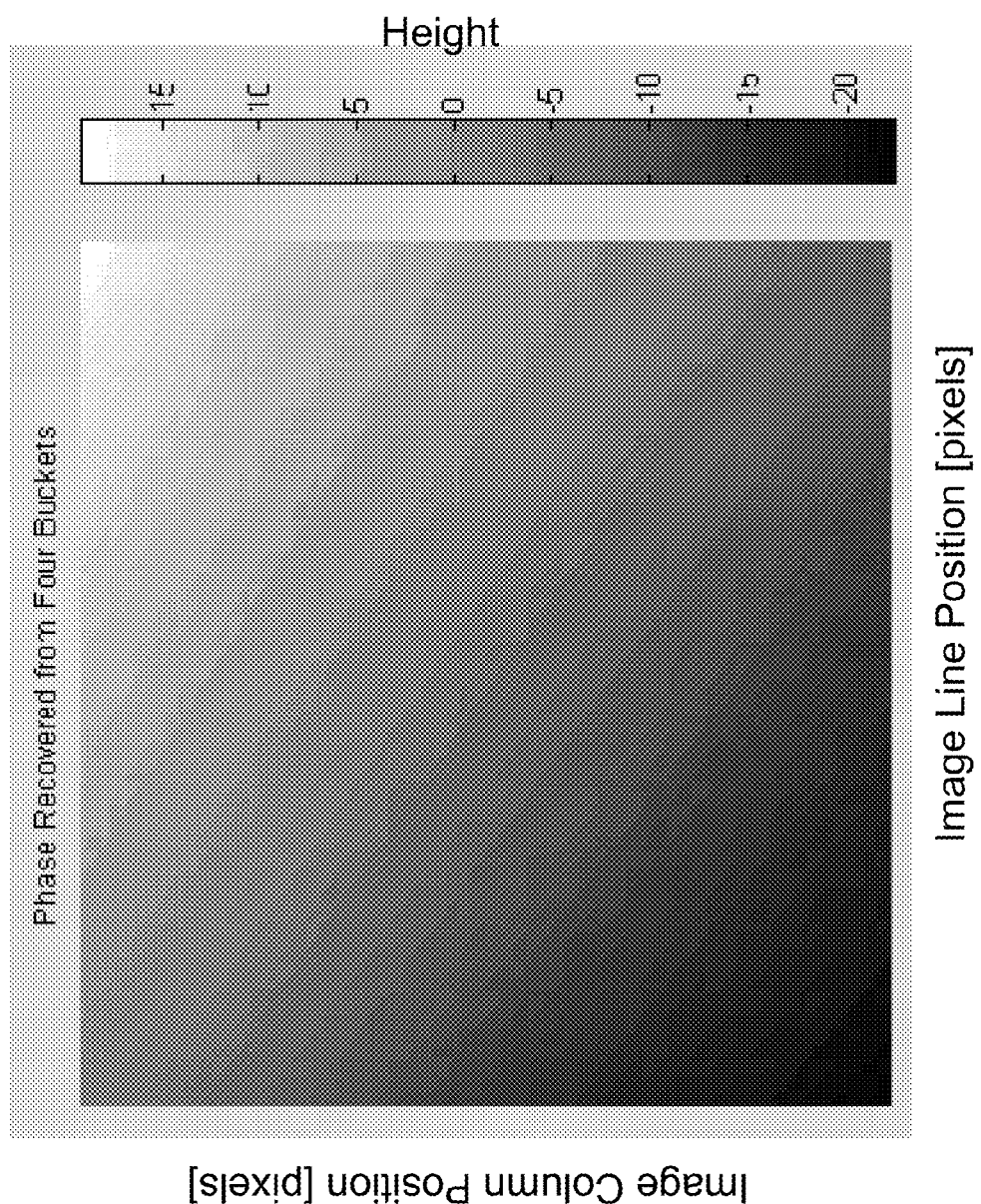
FIG. 7B illustrates the phase recovered from the fringe patterns illustrated in FIG. 7A, in accordance with an embodiment of the present invention.

FIG. 7B illustrates an example of a phase map reconstructed from the data illustrated in FIG. 7A, in accordance with an exemplary embodiment of the present invention. Two-dimensional unwrapping is used as a post process after equation (1) is used to recover the phase map illustrated in FIG. 7B. The phase map, which is computed by the computer system 170 or 570, is recovered as a grayscale spectrum. The shades of gray represent different heights, i.e., recovered phases. The direction of maximum slope for the recovered phase map is indicative of the piston. Note that the direction of maximum slope is rotated relative to FIG. 6B.

The fitted astigmatism, piston, and tilt of the resultant phase maps (such as in FIGS. 6B and 7B) are linear functions of the input piston error and may be used in piston error estimation. (Note that that these phase maps are not the same as an interferometers wavefront maps with respect to the system pupil.) Here as earlier, envelope fitting or centroid tracking may be used as part of the calculation of piston. FIG. 6B illustrates a piston error of 0 waves. Hence, its fringes are not rotated, although they have a somewhat conical shape. FIG. 7B illustrates a piston error of 10 waves. Hence, its fringes are rotated. This rotation effect can be used to detect piston unambiguously for a large range of piston error.

Figure 8:
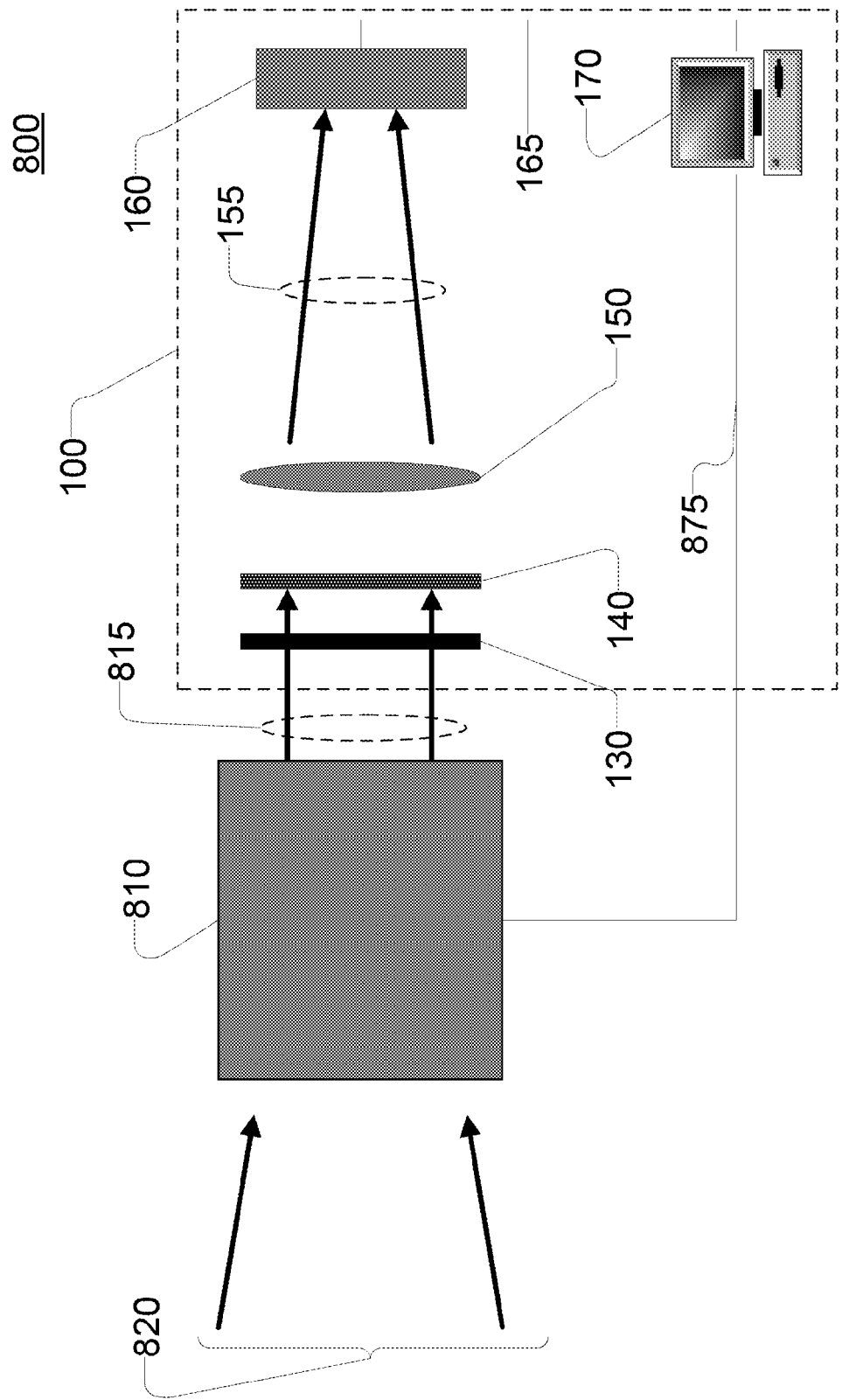
FIG. 8 illustrates a telescope system employing a system for detecting piston error, in accordance with an exemplary embodiment of the present invention.

Illustrated in FIG. 8 is an embodiment of a telescope system 800 employing the piston sensor system 100 illustrated in FIG. 1, in accordance with an exemplary embodiment. The telescope system 800 includes a telescope 810 and the piston sensor system 100 that employs the PPM 130, the QWP 140, the transform lens 150, the image analyzer 160, and the computer system 170 illustrated in FIG. 1.

The telescope 810 collects light 820 from a distant point source using a segment mirror array, such as one that employs the mirror segments of the imaging optics 115 illustrated in FIG. 1. Images of the segmented mirror array are passed to the piston sensor system 100 by the light 815. The piston sensor system 100 detects the piston error between such mirror segments represented in the light 815 using the methods described above for the light 120. Specifically, using the image intensity patterns sensed by the image analyzer 160 and transmitted to the computer system 170 via the data bus 165, the computer system 170 interpolates a set of four intensity maps having common image sample points and then recovers the phase corresponding to the common image sample points. Piston is determined by the value of the phase data at the centroid of the sum of the four intensity images.

Figure 9:
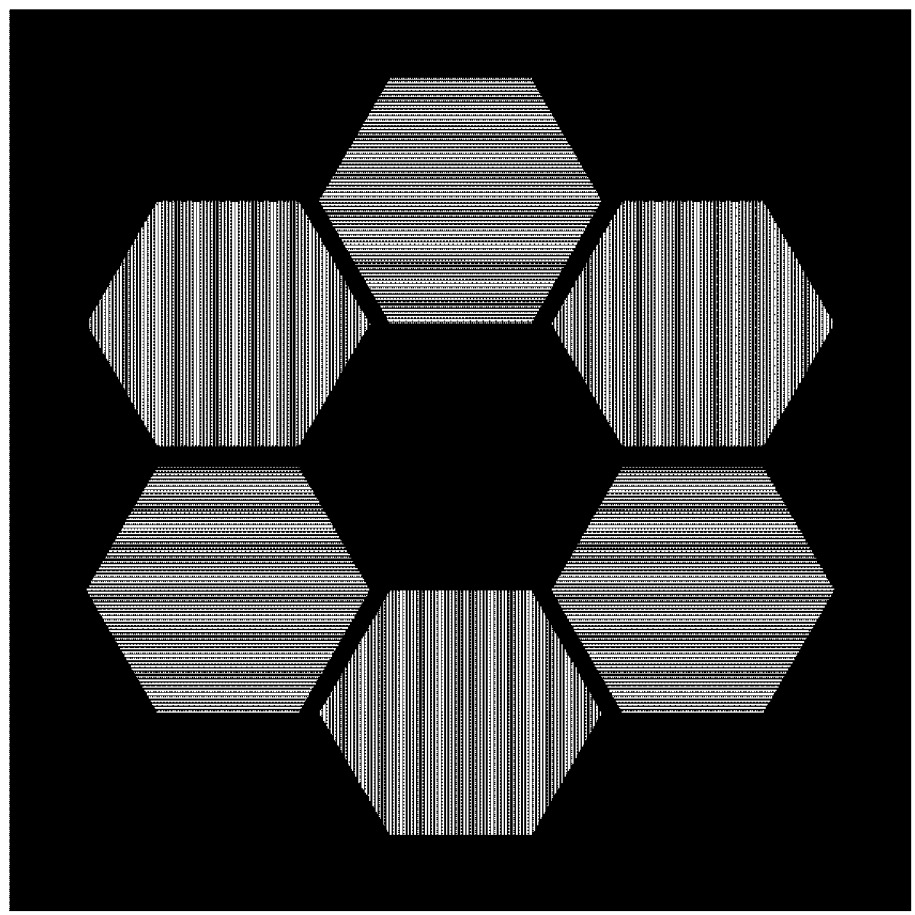
FIG. 9 illustrates a pupil plane mask with six alternating polarizer orientations, in accordance with an embodiment of the present invention.

After computer system 170 detects the piston error, the computer system 170 outputs a control signal via a bus 875 to the telescope 810. The control signal may take the form of a command signal that instructs the telescope 810 to adjust the mirror segments to counteract or reduce the piston offset between the mirror segments. Although not illustrated, the telescope 810 adjusts the mirrors using electric motors Referring now to FIG. 9, there is illustrated an exemplary embodiment of a pupil mask with a pattern of six hexagonal sub-apertures. Each hexagonal aperture includes a polarizer. (The line hatching in the figure indicates the transmission axis of each polarizer.) The polarizers alternate in orientation from one aperture to the next. The pupil mask can be used to modulate pistons between segments for phase retrieval. In the exemplary embodiment illustrated in FIG. 9, six polarizers corresponds to six mirrors.

The hexagonal apertures can be changed for different phase recovery processes: "stopped down" to a small centered circle per segment during segment alignment and "opened up" during figure error recovery. Exemplary applications of the pupil mask illustrated in FIG. 9 include the systems illustrated in FIGS. 10A-B, discussed below.

Referring now to FIGS. 10A and 10B, there are illustrated embodiments of systems for segmented phase retrieval. The systems illustrated in FIGS. 10A and 10B extend the concept of piston sensing in the system 100 to piston diversity sensing or, more generally, pupil or phase diversity sensing. Such systems provide for more phase recovery than piston alone: They provide for full pupil wave recovery via simultaneous phase capture and simple piston adjustment via the analyzer angle.

Referring now to FIG. 10A, there is illustrated a phase diversity sensor system 1000, in accordance with an exemplary embodiment of the present invention. The system 1000 includes an imaging system 1020, a PPM 1030, a QWP 1040, a rotating linear polarizer 1050, a transform lens 1060, and an image detector 1070. Light 1010 enters the imaging system 1020, and a portion 1025 passes through (or is reflected) to the system 1000. The PPM 1030 passes a portion of the light 1025 through two or more apertures located in the PPM 1030. PPM 1030 may include two apertures and, therefore, be constructed similarly to PPM 130 described above, or PPM 1030 may include multiple apertures and, therefore, be constructed similarly to the PPM illustrated in FIG. 9.

The light polarized by the PPM 1030 is passed through the QWP 1040, which may be constructed similarly to the QWP 140 described above, through a rotating linear polarizer 1050, and is focused by the transform lens 1060 onto the image detector 1070. The transform lens 1060 may be constructed similarly to the transform lens 150 described above.

The rotatable polarizer 1050 allows for the image detector 1070 to detect multiple buckets, such as more than four, for example. In the exemplary embodiment illustrated in FIG. 10A, the image detector 1070 is constructed similarly to the image detector 190 discussed above. In other words, the image detector 1070 does not include a micropolarizer array for polarizing light incident to the image detector 1070. Instead, the system 1000 includes the rotating linear polarizer 1050, which is rotatable to vary the polarization orientation of the light focused by the transform lens 1060 on the image detector 1070. The system 1000 (via a computer, not illustrated) rotates the polarizer 1050 to vary the polarization orientation and sequentially captures the fringe patterns on the image detector 1070, which fringe patterns are processed using the methods and hardware described above. The image detector 1070 is capable of detecting polarizations of all angles.

The use of the rotating polarizer 1050 allows for the optional detection of more than four buckets at the expense of simultaneous capture. This option may be desirable for some applications and allows for a continuous variation in differential phase.

Referring now to FIG. 10B, there is illustrated another embodiment of a phase diversity sensor system 1000', in accordance with an exemplary embodiment of the present invention. Like elements in the system 1000' are designated similarly to those illustrated in FIG. 10A for system 1000. Unlike the system 1000, the system 1000' includes a polarizing beam splitter 1080 but lacks a rotating linear polarizer.

The transform lens 1060 of the system 1000' transmits the light transmitted through the QWP 1040 to the polarizing beam splitter 1080 as light 1065'. The polarizing beam splitter 1080 passes through a portion of the light 1065' having a first polarization orientation as light 1075 and reflects another portion of the light 1065' having a second polarization as light 1085. The light 1075 is detected by the image detector 1070, and the light 1085 is detected by the image detector 1090. Thus, the system 1000' is a two-bucket sensor. More polarizing beam splitters may be added to increase the number of buckets in the system.

For the general phase diversity sensing case, a variety of algorithms/technologies may be used to interpret the image data. Such algorithms are generally nonlinear but may be linear in special cases. Examples include, but are not limited to: Error Reduction (Gershberg-Saxton and variations), Stepping Descent, Input Output Method, Maximum Likelihood, and Neural Network. These approaches may be aided by restrictive assumptions on the extent/uniformity of the pupil and the basis functions that comprise the aberrations in the pupil to misalignment, figure error or atmospheric turbulence. They may be used to recover the pupil, scene information or both. Such algorithms and technologies may be implemented using a computer, e.g., a personal computer, (not illustrated in FIGS. 10A and 10B) programmed with software instructions for performing such algorithms and technologies. In such embodiments, such computer is coupled to the one or more image detectors for receiving image data representative of images sensed by the image detectors.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A phase diversity sensor system, comprising:
   a pupil plane mask including two or more open mask areas and two or more polarizers, each polarizer disposed within a respective one of the open mask areas;
   a transform optical element; and
   an image detector,
   wherein a first one of the two or more polarizers has a first polarization orientation and a second of the two or more polarizers has a second polarization orientation.

2. The system of claim 1, further comprising a quarter-wave plate disposed between the pupil plane mask and the image detector, the quarter-wave plate including an extraordinary axis oriented to bisect an angle between the first and second polarization orientations.

3. The system of claim 1, wherein the pupil plane mask further includes two or more quarter-wave plates, each quarter-wave plate disposed within a respective one of the open mask areas.

4. The system of claim 1, wherein the two or more polarizers are circular polarizers configured to produce counter rotating polarizations for light passing through the two or more open mask areas.

5. The system of claim 1, further comprising a polarizer array disposed between the image detector and the transform optical element, the polarizer array including a plurality of sets of polarizers, each of which polarizers in each set having a respective polarization orientation, wherein the image detector includes a plurality of sets of pixel detectors, each of which pixel detectors in each set of pixel detectors having a respective angle and corresponding to a respective polarizer.

6. The system of claim 1, wherein the pupil plane mask includes one or more wedges or gratings that provide spatial separation or spectral dispersion to light polarized by the two or more polarizers.

7. The system of claim 1, further comprising a quarter-wave plate disposed between the pupil plane mask and the image detector, wherein the two or more polarizers are linear polarizers configured to linearly polarize light incident to the pupil plane mask in two orthogonal polarization orientations.

8. The system of claim 1, wherein the transform optical element is configured to deliver an optical signal to the image detector, the optical signal having an intensity of the Fourier transform of the pupil.

9. The system of claim 1, further comprising a rotating linear polarizer disposed between the pupil plane mask and the image detector.

10. The system of claim 1, wherein the image detector is a first image detector and the system further comprises:
a second image detector; and
a polarizing beam splitter disposed between the pupil plane mask and the first image detector, the polarizing beam splitter configured to pass light having a first polarization orientation to the first image detector and to reflect light having a second polarization orientation to the second image detector.

11. A system for detecting piston diversity between mirror segments, the system comprising:
a pupil plane mask including two or more open mask areas and two or more polarizers, each polarizer disposed within a respective one of the open mask areas;
a transform optical element; and
an image detector,
wherein a first one of the two or more polarizers has a first polarization orientation and a second of the two or more polarizers has a second polarization orientation.

12. The system of claim 11, further comprising a computer coupled to the image detector, wherein:
the image detector is configured to sense a fringe pattern of light projected thereon and to output image data representative of the sensed fringe pattern to the computer, and
the computer is configured to ascertain the piston diversity depending on the image data.

13. The system of claim 11, further comprising a polarizer array disposed between the transform lens and the image detector, the polarizer array comprising a plurality of sets of polarizers, each of which polarizers in each set having a respective polarization orientation, wherein the image detector includes a plurality of sets of pixel detectors, each of which pixel detectors in each set of pixel detectors having a respective angle and corresponding to a respective polarizer.

14. The system of claim 11, wherein:
the image detector is configured to sense intensity images for a plurality of phases, and
the computer is configured to recover a phase at a plurality of common sample points of the intensity images and to determine a value of the piston diversity based on the recovered phase at the plurality of common sample points.

15. A system for co-aligning mirror segments in a telescope, the system comprising:
a telescope including an array of mirror segments, the array of mirror segments including first and second mirror segments;
a pupil plane mask including two or more open mask areas and two or more polarizers, each polarizer disposed within a respective one of the open mask areas;
a transform optical element; and
an image detector,
wherein a first one of the two or more polarizers has a first polarization orientation and a second of the two or more polarizers has a second polarization orientation.

16. The system of claim 15, further comprising a computer coupled to the image detector, wherein:
the image detector is configured to sense a fringe pattern of light projected thereon and to output image data representative of the sensed fringe pattern to the computer, and
the computer is configured to ascertain piston diversity between the first and second mirror segments depending on the image data.

17. The system of claim 16, further comprising:
an electric motor coupled to the first mirror segment for adjusting the piston of the first mirror segment,
wherein the computer operates the electric motor to adjust the piston of the first mirror segment to achieve co-alignment between the first and second mirror segments.

18. The system of claim 16, wherein:
is the image detector is configured to sense intensity images for a plurality of phases, and
the computer is configured to recover a phase at a plurality of common sample points of the intensity images and to determine a value of a piston between the first and second mirror segments based on the recovered phase at the plurality of common sample points.

19. The system of claim 15, further including one or more quarter-wave plates, wherein:
the pupil plane mask is configured to polarize light carrying a wavefront error resulting from the first mirror segment being offset from the second mirror segment,
the one or more quarter-wave plates are configured to counter-rotate polarizations of the polarized light, and
the transform optical element is configured to focus the light having counter-rotated polarizations onto the image detector.

20. The system of claim 15, further comprising a polarizer array disposed between the image detector and the transform optical element, the polarizer array including a plurality of sets of polarizers, each of which polarizers in each set having a respective polarization orientation, wherein the image detector includes a plurality of sets of pixel detectors, each of which pixel detectors in each set of pixel detectors having a respective angle and corresponding to a respective polarizer.

* * * * *